US012499153B1

(12) United States Patent
Neale et al.

(10) Patent No.: US 12,499,153 B1
(45) Date of Patent: Dec. 16, 2025

(54) DECENTRALIZED HASH TABLE

(71) Applicant: Block, Inc., San Francisco, CA (US)

(72) Inventors: Michael David Neale, Wentworth Falls (AU); Gabriel Cohen, Oakland, CA (US)

(73) Assignee: Block, Inc., Oakland, CA (US)

( * ) Notice: Subject to any disclaimer, the term of this patent is extended or adjusted under 35 U.S.C. 154(b) by 65 days.

(21) Appl. No.: 18/402,607

(22) Filed: Jan. 2, 2024

Related U.S. Application Data

(60) Provisional application No. 63/585,906, filed on Sep. 27, 2023.

(51) Int. Cl.
 *G06F 16/901* (2019.01)
 *G06F 16/951* (2019.01)
 *H04L 9/32* (2006.01)
(52) U.S. Cl.
 CPC ........ *G06F 16/9014* (2019.01); *G06F 16/951* (2019.01); *H04L 9/3242* (2013.01); *H04L 9/3247* (2013.01)

(58) Field of Classification Search
 CPC .......................... G06F 16/9014; G06F 16/951
 See application file for complete search history.

(56) References Cited

U.S. PATENT DOCUMENTS

| | | | | |
|---|---|---|---|---|
| 2011/0276563 | A1* | 11/2011 | Sandoval | H04L 63/102 707/723 |
| 2022/0100372 | A1* | 3/2022 | Lin | G06F 3/0617 |
| 2023/0055091 | A1* | 2/2023 | Abramovitz | H04L 47/125 |

* cited by examiner

*Primary Examiner* — Glenford J Madamba
*Assistant Examiner* — Abderrahmen Chouat
(74) *Attorney, Agent, or Firm* — IP Spring

(57) ABSTRACT

Decentralized hast table techniques are described. In an implementation, a hash table input is received including a decentralized identifier and index data configured to locate the decentralized identifier. A hash table entry is generated for inclusion in a decentralized hash table in compliance with a hash table schema. A decentralized identifier search query is received from a client device. The decentralized hash table is searched based on the index data using the decentralized identifier search query. A decentralized search result is generated that includes the decentralized identifier for receipt by the client device responsive to the searching.

19 Claims, 20 Drawing Sheets

DECENTRALIZED HASH TABLE

RELATED APPLICATION

This Application claims priority under 35 U.S.C. § 119(e) to U.S. Provisional Patent Application No. 63/585,906, filed Sep. 27, 2023, and titled "Decentralized-to-Digital Service Relay," the entire disclosure of which is hereby incorporated by reference.

TECHNICAL FIELD

Decentralized networks provide a variety of functionality in connection with implementing and securely transferring various digital assets, examples of which include cryptocurrencies and cryptographic-based tokens, such as tokens for decentralized web applications, applications implemented as part of a distributed state machine, and so on. Additional functionalities have been developed that build "on top" of decentralized networks, examples of which leverage use of decentralized identifiers (DIDs) as part of message communication.

Figure 1:
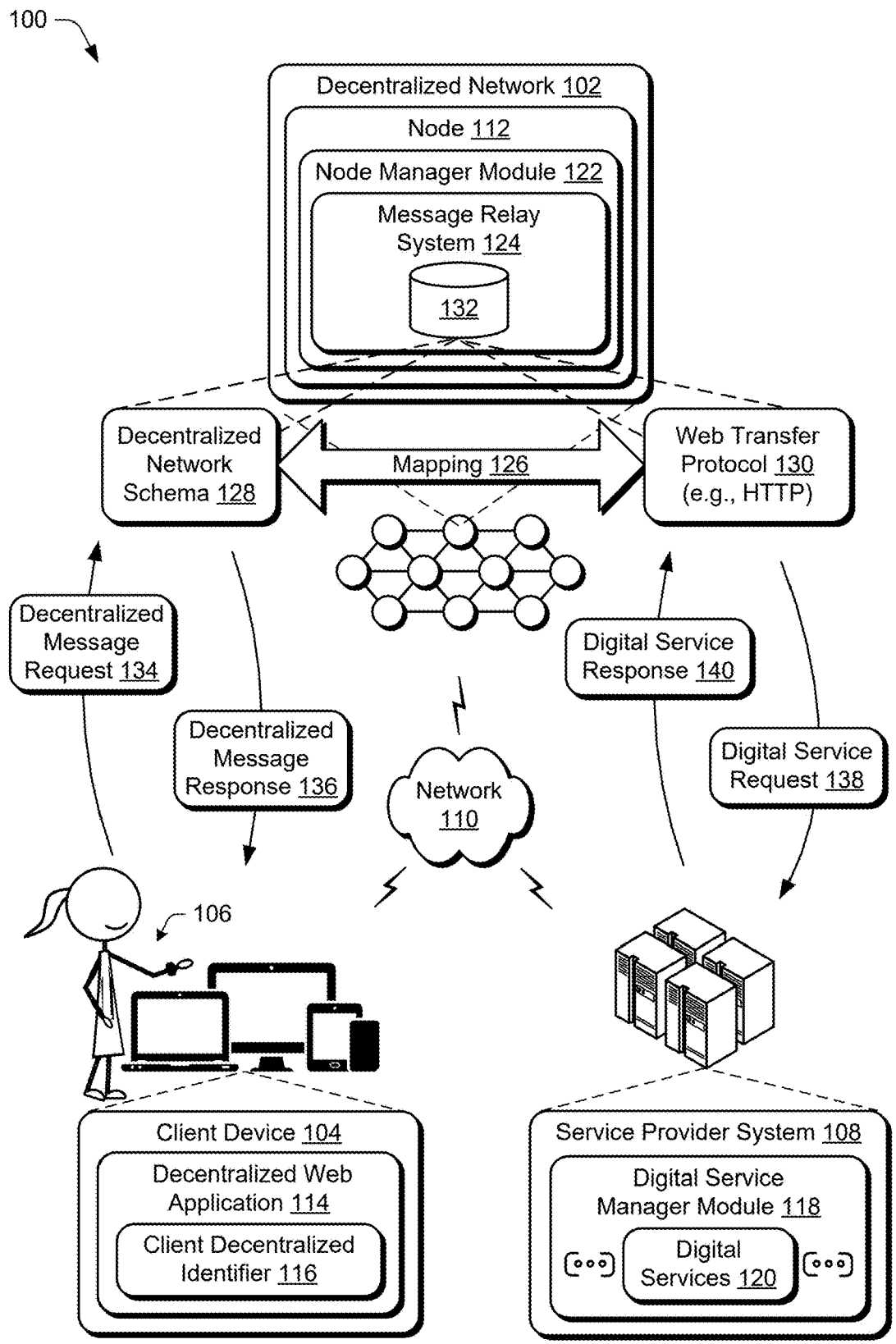
FIG. 1 is a non-limiting illustration of an example system that is operable to implement decentralized-to-digital service relay techniques as described herein according to an implementation of the present subject matter.

The detailed description is described with reference to the accompanying figures. Entities represented in the figures are indicative of one or more entities and thus reference is made interchangeably to single or plural forms of the entities in the discussion.

DETAILED DESCRIPTION

Overview

Service provider systems are typically implemented to be accessible via a web transfer protocol that defines how messages are formatted for communication, how to locate endpoints with a network, and so forth. An example of a web transfer protocol includes a hypertext transfer protocol (HTTP), which is an application layer protocol that serves as a foundation for conventional data communication in the world wide web, i.e., the Internet. A decentralized network, on the other hand, is configured to leverage techniques involving decentralization that are buildable "on top" of blockchains, examples of which are commonly referred to as "Web3," "Web5," and so on.

In some scenarios, however, conventional service provider systems are confronted with numerous technical challenges that limit feasibility of these systems to support decentralized networks. In an example in which the one or more digital services involve banking, for instance, the infrastructure implemented by the digital service manager module in providing the digital services is refined over decades to support technical consistency, historical compliance with regulatory standards, and so forth. Because of this, digital services implemented in these conventional scenarios are incompatible with decentralized techniques implemented by the decentralized network.

To address these technical challenges, a message relay system is described. The message relay system is configured to support a mapping between a decentralized network schema used to implement message communication within the decentralized network and a web transfer protocol (e.g., HTTP) used to support communication with digital services of the service provider system. In this way, the message relay system acts as a bridge in support of standardization between the decentralized network schema and the web transfer protocol. The message relay system, for instance, is configurable to translate the decentralized message request to form a digital service request that is compatible with the digital services. Likewise, the message relay system is configurable to translate the digital service response based on the mapping to generate a decentralized message response that is compatible with the decentralized web application. In this way, the client device is able to access functionality made available via the digital services at the service provider system without changes being made to either the client device or the service provider system by leveraging the standardization implemented by the message relay system, which improves efficiency in computational resource consumption, support for legacy devices, and reduced power consumption.

Additionally, conventional techniques used to implement a decentralized identifier within a decentralized network are not addressable. Awareness of a decentralized identifier, therefore, is limited in conventional techniques to manual sharing of the decentralized identifier between entities. For example, a first entity that wishes to locate data associated with a second entity in a conventional scenario (e.g., to transfer resources) is tasked with contacting that entity via an alternate channel (e.g., a centralized email or messaging service, text message, or the like) to obtain a corresponding decentralized identifier of the second entity, which is then resolved to find a corresponding endpoint, at which, the data is located. If the two entities do not already have an established relationship in this conventional scenario, the first entity may rely on services such as centralized search engines (which may be biased unfavorably to the parties involved, collect and use data about the entities in undesirable ways, etc.) to identify the second entity, which nullifies the independently-established trust mechanisms of decentralized systems. Thus, the first entity is tasked with both first being aware of the second entity and then contacting the second entity to obtain the decentralized identifier. As a result, this limitation in awareness and addressability directly affects usability of the decentralized environment as well as functionality that relies on these techniques, computational and network resources used to support this functionality, and so forth.

To address these and other technical challenges, techniques and systems are described that implement a decentralized hash table. The decentralized hash table includes hash table entries that are individually searchable to link index data as part of a search to locate a corresponding decentralized identifier. The index data, for instance, is configurable to describe an entity associated with a decentralized identifier, endpoint data maintained at an endpoint of a node that is resolvable based on the decentralized identifier, and so forth in accordance with a hash table schema. The hash table schema, for instance, supports standardization of a definition of the hash table entries, storage of the hash table entries, and how searches are performed for the hash table entries. In this way, the hash table schema overcomes conventional technical challenges encountered in unstandardized approaches to expand sharing and accessibility of decentralized identifiers. Accordingly, entities operating in a decentralized environment can leverage the decentralized hash table to search for other entities (e.g., specifically or categorically) without relying on centralized search engines to identify other entities, or external communication services such as centralized email or messaging services to exchange decentralized identifiers, to then operate in the decentralized environment with one another. Thus, the described techniques provide more secure (e.g., enhanced privacy) for entities than with conventional systems, as well as reducing communications sent over various networks to operate with efficiency within such systems.

Additional functionality is also supported through use of the decentralized hash table, including an ability by a hash service system to crawl endpoints and index data available at those endpoints to form the decentralized hash table. Publication and subscription functionality is further supported in which entities subscribe to topics at a hash service system and receive publications generated using index data that are based on the topics. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Decentralized-to-Digital Service Relay

FIG. 1 is a non-limiting illustration of an example system 100 that is operable to implement decentralized-to-digital service relay techniques as described herein according to an implementation of the present subject matter. The system 100 includes a decentralized network 102, a client device 104 associated with an entity 106 (e.g., a user), and a service provider system 108 that are communicatively coupled, one to another, via a network 110. The decentralized network 102, the client device 104, and the service provider system 108 are implemented using one or more computing devices. The computing devices support execution of instructions by a processing device that are stored in a computer-readable storage medium, e.g., that is non-transitory.

Computing devices are configurable in a variety of ways. Examples of computing device configurations include a server, a desktop computer, a laptop computer, a mobile device (e.g., assuming a handheld configuration such as a tablet or mobile phone), an IoT device, a wearable device (e.g., a smart watch), an augmented reality/virtual reality device, and so forth. For the service provider system 108, for instance, clusters of graphics processing units (GPUs) are also contemplated, e.g., to accelerate implementation of artificial intelligence or other functionality. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud," e.g., as part of a media content platform.

The decentralized network 102 is implemented using a plurality of nodes (e.g., web nodes, decentralized nodes), an example of which is illustrated as node 112. The node 112 is representative of a computer or other device involved in implementation of the decentralized network 102, e.g., tasked with validating transactions and maintaining a copy of a blockchain ledger as further described in relation to FIG. 2. The node 112, for instance, is representative of a computing device that is locatable via the decentralized network 102 using a decentralized identifier.

The client device 104, for instance, includes a decentralized web application 114 that is executable to support interaction with the decentralized network 102. The decentralized web application 114 is configurable in a variety of ways, such as to implement a "digital wallet" in support of cryptographic transactions, digital content access applications (e.g., digital content download and streaming applications), applications that support peer-to-peer transactions, and so forth.

The decentralized web application 114 in the illustrated example includes a decentralized identifier 116. The decentralized identifier 116 is configured as a self-owned identifier that supports decentralized authentication and routing. A self-owned identifier in a blockchain network is a unique identifier that is owned and controlled by an individual entity (e.g., on a blockchain), also referred to as a "self-sovereign identity," as contrasted with an entity controlled by a centralized authority (e.g., service provider system) that is vulnerable to attacks, hacks, and data breaches. The decentralized identifier is configurable without use of subjective consensus as implemented using a conventional centralized service provider, but rather are self-generated and self-owned. Persistence of the decentralized identifier is maintainable via local storage and offline storage and are resistant to interruption or stoppage by outside forces or authorities. The decentralized identifier is also universally indexed and discoverable.

The decentralized identifier 116, for instance, is usable to identify a respective entity 106, node 112, and so on in a manner that is globally unique and is cryptographically verifiable. To do so, the decentralized identifier 116 is resolved to a respective location in the decentralized network 102 as further described in relation to FIG. 4. The decentralized identifier 116 is configurable through the decentralized network 102 (e.g., using a blockchain or other distributed ledger technique implemented as part of a decentralized network) to securely authenticate an identity of a corresponding entity.

The service provider system 108 includes a digital service manager module 118 that is configured to manage execution of one or more digital services 120. Digital services 120 are executable to implement a variety of functionality that is made accessible via a network 110, e.g., via a browser, network-enabled application, and so on. Examples of digital services 120 include resource transfer services (e.g., involving cryptographic tokens, cryptocurrency, fiat currency, and so on), peer-to-peer resource transfer services, digital content streaming and download services, social media services, content creation services, data storage services, website and webpage providers, and so forth.

In typical real-world scenarios, the service provider system 108 is accessible via a web transfer protocol that defines how messages are formatted for communication, how to locate endpoints with a network, and so forth. An example of a web transfer protocol includes a hypertext transfer protocol (HTTP), which is an application layer protocol that serves as a foundation for conventional data communication in the world wide web, i.e., the Internet.

The decentralized network 102, on the other hand, is configured to leverage techniques involving decentralization that are buildable "on top" of blockchains, examples of which are commonly referred to as "Web3," "Web5," and so on. The decentralized network 102, for instance, is buildable as a "layer 2" protocol on top of a blockchain network, is implemented directly by a blockchain network, and so forth.

The decentralized network 102 may leverage one or more open protocols defined using objects described by schemas and paths to describe rules and relationships associated with and between the objects. Rules may refer to read/write privileges, and relationships may refer to relational mapping between two or more objects. For instance, an open protocol may include concepts such as type, which defines the elements used the protocol; structure, which outlines the rules and relationships between the types, and actions, which describe the read/write privileges of different objects, such as according to the following:

```
{
  playlist: {
    $actions: [...],
    track: {
      $actions: [...],
    },
  },
  track: {
    $actions: [...],
  }
}
```

In an example scenario related to a music or video playlist creation, there may be two types comprising "playlist" and "track," where the respective types include a JSON schema that describe what properties can be expected in the individual types. Alternatively or additionally, the protocol structure may have two top level paths denoted "playlist" and "track," and/or a nested path denoted "playlist/track." In the respective examples, there may be a ruleset assigned to "playlist," a ruleset assigned to "track," and/or a ruleset assigned to "playlist/track" accordingly. In some cases, the ruleset assigned to "playlist/track" may apply when a track belongs to a playlist; otherwise, the ruleset for "track" applies. By leveraging the "playlist/track" contextual relationship, additional functionality can be defined using the protocol, such as to display a specific image when that track is played within the particular playlist.

Additionally, as mentioned above, actions can be defined using the open protocol. Continuing with the music or video playlist example, an example action may be defined by:

```
{
    ...
    "track": {
        $actions: [
            {
                "who": "author",
                "of": "playlist",
                "can": "write"
            },
            {
                "who": "anyone",
                "can": "read"
            },
        ],
    }
    ...
}
```

In the example action above, "who" may be an author, a recipient, or any other entity operating in the decentralized network 102. Further, "of" may be operational, e.g., can indicate a related type, and "can" may be read, write, and so forth. Other fields that may be included in the schema may include, but are not limited to, track identifier (ID), album ID, artist ID, barcode ID, title, artist name(s), type of playlist (e.g., album, user-created, single, etc.), copyright information, and the like.

In some scenarios, conventional service provider systems 108 are confronted with numerous technical challenges that limit feasibility of these systems to support decentralized networks. In an example in which the one or more digital services 120 involve banking, for instance, the infrastructure implemented by the digital service manager module 118 in providing the digital services 120 is refined over decades to support technical consistency, historical compliance with regulatory standards, and so forth. Because of this, digital services 120 implemented in these conventional scenarios are incompatible with decentralized techniques implemented by the decentralized network 102.

To address these technical challenges, a node manager module 122 of the node 112 in the illustrated example implements a message relay system 124. The message relay system 124 is configured to support a mapping 126 between a decentralized network schema 128 used to implement message communication within the decentralized network 102 and a web transfer protocol 130 (e.g., HTTP) used to support communication with digital services 120 of the service provider system 108. Data describing the decentralized network schema 128 and the web transfer protocol 130 is illustrated as maintained in a storage device 132 of the node 112.

The message relay system 124 acts as a bridge between the decentralized network schema 128 and the web transfer protocol 130. The client device 104, for instance, is configured to communicate messages in accordance with the decentralized network schema 128, e.g., to transmit a decentralized message request 134 and receive a decentralized message response 136. The service provider system 108, on the other hand, is configured to communicate messages in accordance with the web transfer protocol 130, e.g., to receive a digital service request 138 and reply with a digital service response 140.

The message relay system 124, for instance, is configurable to translate the decentralized message request 134 to form a digital service request 138 that is compatible with the digital services 120. Likewise, the message relay system 124 is configurable to translate the digital service response 140 based on the mapping 126 to generate a decentralized message response 136 that is compatible with the decentralized web application 114. In this way, the client device 104 is able to access functionality made available via the digital services 120 at the service provider system 108 without changes being made to either the client device 104 or the service provider system 108.

The message relay system 124, for instance, supports backwards compatibility for "Web2" infrastructures that rely on HTTP to operate with decentralized protocols, e.g., Web3 and/or Web5 protocols. The message relay system 124 is executable as a standalone process that is separated by a network boundary. Although illustrated as implemented by a node 112 of the decentralized network 102, the message relay system 124 may be implemented in a variety of other ways, such as via a third-party service provider system, locally on the client device 104 and/or the service provider system 108, and so on. The message relay system 124 is thus configured to overcome conventional technical challenges through support of standardization and leveraging machine learning, further discussion of which is included in the following description and shown in a corresponding figure.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
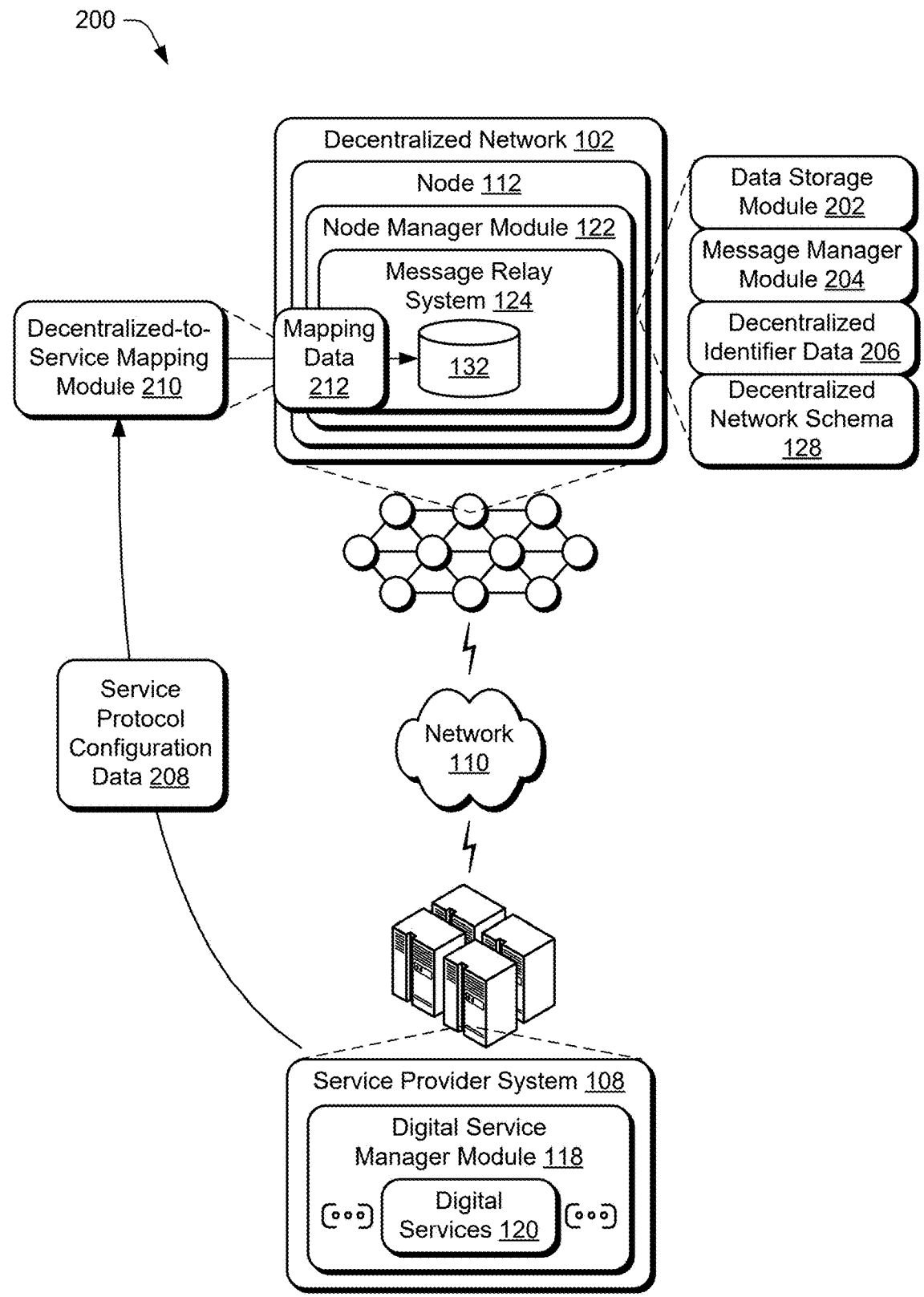
FIG. 2 is a non-limiting illustration of an example system showing operation of a message relay system in a decentralized network of FIG. 1 in greater detail according to an implementation of the present subject matter.

FIG. 2 is a non-limiting illustration of an example system 200 showing operation of a message relay system in a decentralized network of FIG. 1 in greater detail according to an implementation of the present subject matter. The decentralized network 102 includes a node 112 having a node manager module 122 implementing a message relay system 124 and a storage device 132 as previously described. The node 112 is representative of a computer or other device involved in implementation of a decentralized network, e.g., tasked with validating transactions and maintaining a copy of a blockchain ledger.

The node manager module 122 is configured to implement functionality in support of communication and message relay between the nodes 112 of the decentralized network 102 as well as with the client device 104 and service provider system 108 via the network 110. Examples of functionality to do so include a data storage module 202 and a message manager module 204. The data storage module 204 is configured to collect and maintain decentralized identifier data 206. The decentralized identifier data 206 is formatted in accordance with a decentralized network schema 128 to support decentralized authentication and routing as performed by the message manager module 204, e.g., for communication between nodes and/or with the service provider system 108.

The node 112 of the decentralized network 102, as representative of one of a plurality of decentralized nodes (e.g., decentralized web nodes), supports data storage and relays that allows entities, transaction systems, individuals, organizations and so forth to send, store, and receive encrypted or public messages and data. The node 112 is universally addressable and is "crawlable" using data addressing in relation to the decentralized identifiers. The node 112 is also configured to support decentralized replication of data across the nodes that is "eventually consistent" (e.g., the data is consistent across the nodes over time through continued data communication between the nodes) through communication of instances across individual nodes in the decentralized network 102. The node 112 supports secure encryption through use of a cryptographic key associated with an individual's decentralized identifier.

The service provider system 108 is communicatively coupled to the decentralized network 102 via the network 110. The service provider system 108 includes a digital service manager module 118 as previously described to implement digital services 120 that are accessible via the network 110. The service provider system 108 in this example leverages the message relay system 124 to expand accessibility of the digital services 120 via the decentralized network 102, which is not possible in conventional techniques.

To do so, the service provider system 108 communicates service protocol configuration data 208 that describes implementation and accessibility of the digital services 120 via the network 110. The service protocol configuration data 208, for instance, describes how the digital services 120 are accessed using the web transfer protocol 130, e.g., a hypertext transfer protocol. For example, the service protocol configuration data 208 is configured to describe application programming interface (API) endpoints locatable via the web transfer protocol 130 using respective uniform resource locators (URLs) or uniform resource identifiers (URIs), via which, requests are made to interact with the digital services 120. These API endpoints, however, are inaccessible, directly, using the decentralized network schema.

The service protocol configuration data 208, for instance, describes representational state transfer APIs (i.e., RESTful APIs) as a set of conventions and principles employed in implementing the digital services 120. To do so, the service protocol configuration data 208 is configurable to indicate whether responses are cacheable, includes resource identification, identify which resource manipulation techniques are supported (e.g., HTTP techniques such as GET, POST, PUT, DELETE), how interactions are implemented within a layered system, whether code on demand is supported, status code support, payload types, error handling, and so forth.

A decentralized-to-service mapping module 210 is then employed by the message relay system 124 to generate mapping data 212 based on the service protocol configuration data 208 and the decentralized network schema 128. The mapping data 212 is configured to map properties described in the service protocol configuration data 208 to corresponding properties in the decentralized network schema 128. In this way, the message relay system 124 employs the mapping data 212 to act as a bridge between the service provider system 108 and interaction via the decentralized network 102, e.g., with the client device 104. The mapping data 212 may be generated in a variety of ways, an example of which is described in the following discussion.

Figure 3:
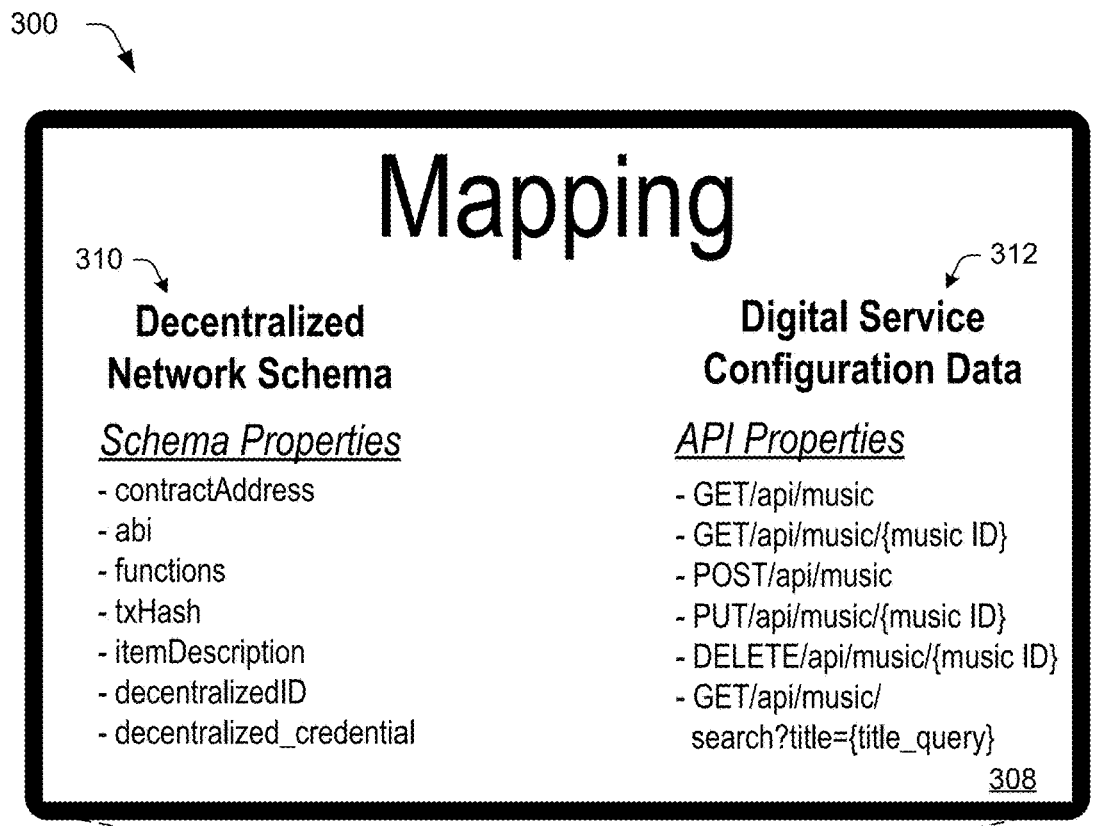
FIG. 3 is a non-limiting illustration of an example system showing operation of a decentralized-to-service mapping module of FIG. 2 in greater detail according to an implementation of the present subject matter.
Figure 3:
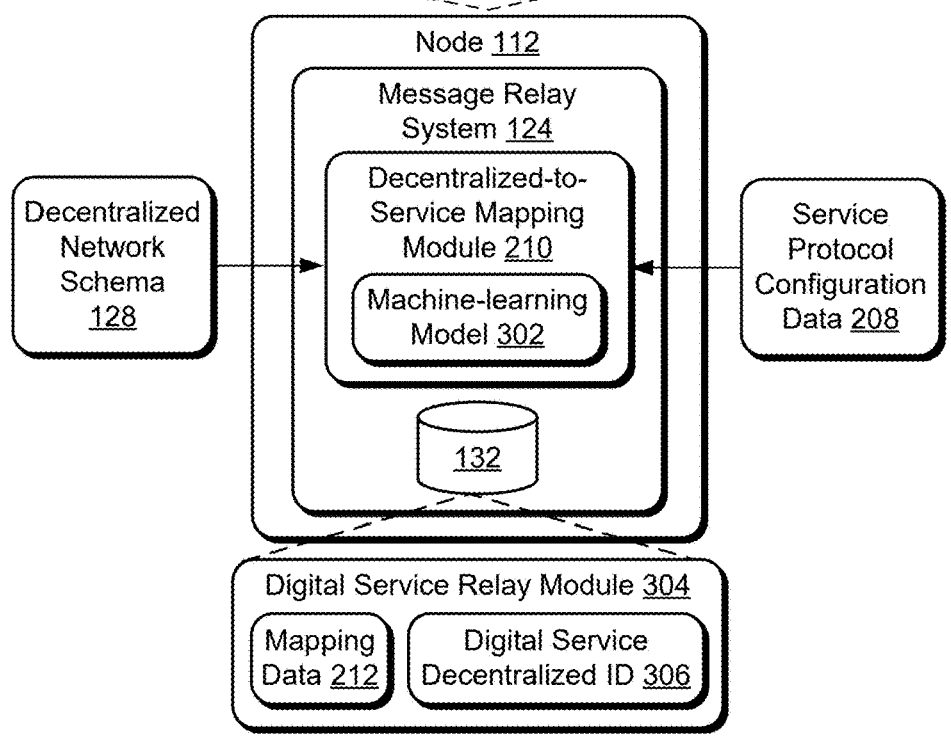

FIG. 3 is a non-limiting illustration of an example system 300 showing operation of a decentralized-to-service mapping module 210 of FIG. 2 in greater detail according to an implementation of the present subject matter. The decentralized-to-service mapping module 210 receives as an input the decentralized network schema 128 (e.g., as corresponding to a particular decentralized network 102) and the service protocol configuration data 208 from the service provider system 108 as described in relation to FIG. 2. The decentralized-to-service mapping module 210 then generates the mapping data 212 by mapping properties between the decentralized network schema 128 and the service protocol configuration data 208, which may be performed in a variety of ways.

The service protocol configuration data 208, in one or more examples, is configurable as follows:

```
{
    "handlers": [
        {
            "filter": {
                "method": "CollectionsWrite",
                "schema": "https://ssi-schemas.org/CredentialApplication",
                "protocol": ""
            },
            "endpoint": {
                "method": "POST",
                "url": "https://somehost/some-endpoint",
                "requestOptions": { },
                "responseMapping": {
                    "201": {
                        "method": "CollectionsWrite",
                        "schema": "https://ssi-schemas.org/CredentialApplication"
                    }
                }
            }
        }
    ]
}
```

In one or more examples, the decentralized-to-service mapping module 210 is configured to generate the mapping data 212 automatically and without user intervention. The decentralized-to-service mapping module 210, for instance, is configured to first identify what properties are included in the decentralized network schema 128 and the service protocol configuration data 208 and then map these properties to each other.

To do so in the illustrated example, a machine-learning module 302 is trainable and retrainable to identify the properties and map correspondence between the properties. A machine-learning model 302 refers to a computer representation that is tunable (e.g., through training and retraining) based on at least one input without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

The decentralized-to-service mapping module 210 is also configurable to employ the machine-learning model 302 as part of generative artificial intelligence (AI) to generate the mapping data 212. The mapping data 212, for instance, is configured as executable code to implement a digital service relay module 304 that is configured to perform the mapping between the decentralized network schema 128 and the service protocol configuration data 208.

The machine-learning model 302, as implementing generative AI, is configurable according to a transformer model architecture as a generative pretrained transformer to generate text forming executable code based on an input. To do so, the machine-learning model 302 generates tokens to represent words or portions of words in the decentralized network schema 128 and/or the service protocol configuration data 208. The tokens are then processed in order by generating a context that includes each of the tokens in the sequence before it as part of mapping the properties to each other. Accordingly, the machine-learning model 302 in this example is trained and retrained using training data to generate the digital service relay module 304 as being executable to implement the mapping data 212.

The decentralized-to-service mapping module 210 is also configurable to generate a decentralized identifier. The decentralized identifier is configured to identify a corresponding digital service 120 such that the digital services 120 is locatable via the decentralized network 102, which is illustrated as a digital service decentralized ID 306. To do so, the decentralized network 102 is selected, and a cryptographic algorithm is employed to generate a key pair having a public key and a private key. The decentralized identifier is then formed as having a prefix followed by an identifier of a corresponding decentralized network 102, followed by an identifier derived from the public key or another source. A DID document may also be created that describes how to use the decentralized ID, e.g., by identifying associated public keys, authentication protocols, service endpoints, and so on. The decentralized identifier is then registered as part of the decentralized identifier data 206, e.g., in order to resolve the decentralized identifier to a respective node 112.

The decentralized-to-service mapping module 210 is also configurable to support manual interaction via a user interface 308 that is displayed to generate the mapping data 212. The user interface 308, for instance, includes representations 310 of properties from the decentralized network schema and representations 312 of properties from the service protocol configuration data. Inputs are then received via the user interface 308 specifying the mapping between the one or more properties specified by the decentralized network schema 128 to corresponding properties specified as part of the service protocol configuration data 208. The inputs, for instance, may be received as textual inputs to indicate corresponding, drawn connectors via corresponding representations, received via a spoken utterance, and so forth. A variety of other examples are also contemplated. Accordingly, once generated, the mapping data 212 is employed by the message relay system 124 to bridge communication of messages that comply with the decentralized network schema 128 with messages that comply with the service protocol configuration data 208 as further described in the following example.

Figure 4:
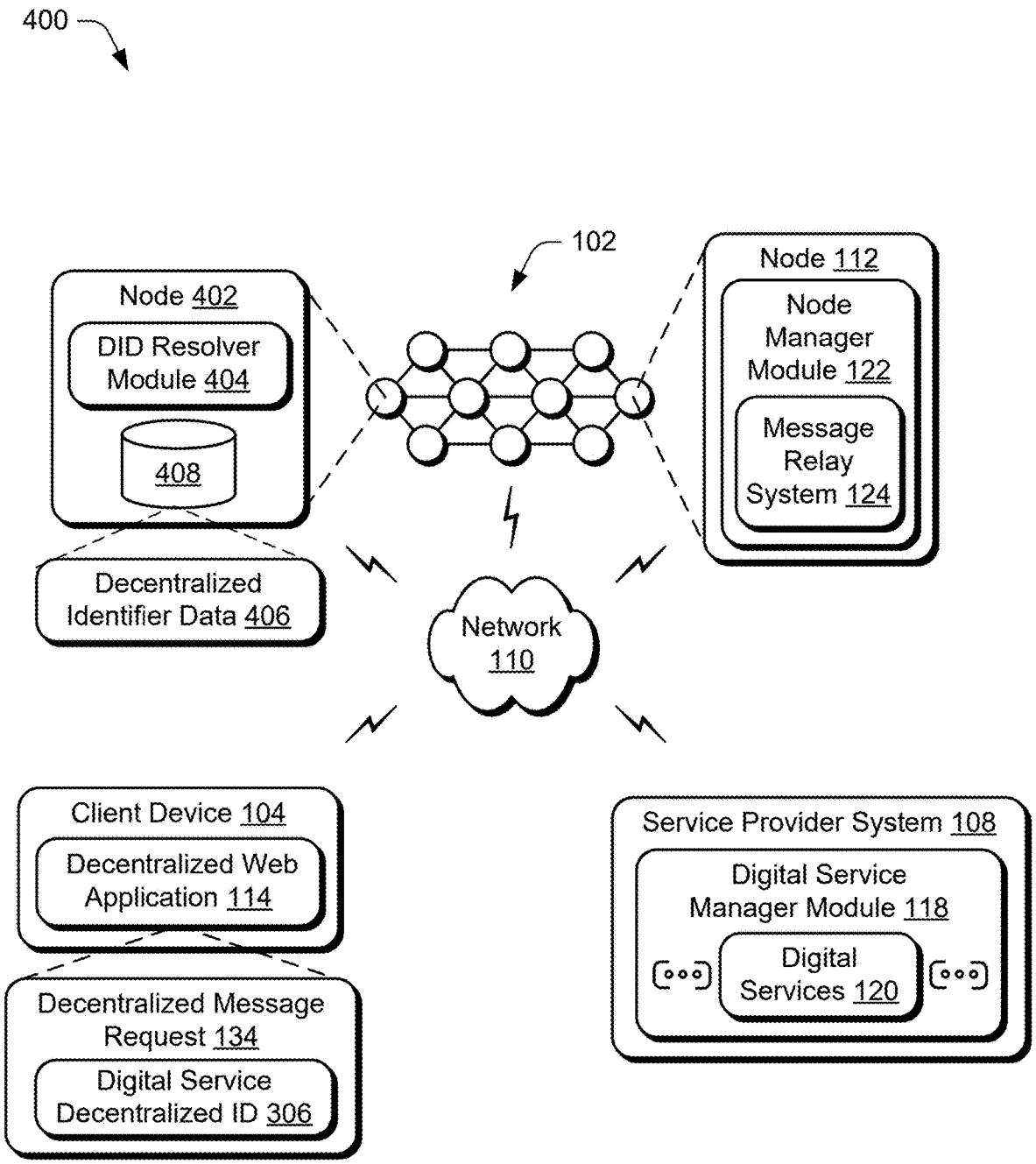
FIG. 4 is a non-limiting illustration of an example system that is operable to resolve a decentralized identifier associated with a digital service to a message relay system as described herein according to an implementation of the present subject matter.

FIG. 4 is a non-limiting illustration of an example system 400 that is operable to resolve a decentralized identifier associated with a digital service to a message relay system as described herein according to an implementation of the present subject matter. To begin in this example, the client device 104 initiates interaction with the digital services 120 of the service provider system 108. To do so, a decentralized web application 114 generates a decentralized message request 134 that includes a digital service decentralized ID 306 associated with the digital services 120.

Node 402, included as part of the decentralized network 102 in the illustrated implementation, includes a DID resolver module 404 that leverages decentralized identifier data 406 maintained in a storage device 408. The DID resolver module 404 is usable to assist in resolving decentralized identifiers to locate digital services using the message relay system 124 via the decentralized network 102.

In this example, the client device 104, through execution of the decentralized web application 114, passes a digital service decentralized ID 306 via the network 110 to the node 402. The digital service decentralized ID 306 is then resolved through execution of the DID resolver module 404 at the node 402 to locate the message relay system 124, and more particularly a digital service relay module 304 associated with the digital services 120.

To do so, DID resolver module 404 parses the digital service decentralized ID 306 to locate a corresponding decentralized network 102 used to implement the identifier. The digital service decentralized ID 306 is then resolved based on techniques defined for the decentralized network 102.

The DID resolver module 404, for instance, utilizes decentralized identifier data 406 to fetch a DID document, which is configurable as a JavaScript Object Notation (JSON) object that includes information about the digital service decentralized ID 306. This information includes public keys and service endpoints usable to locate the node 112 in the decentralized network 102 that corresponds to the digital service decentralized ID 306 and more particularly the message relay system 124 utilized to communicate with the digital services 120 in this example. The message relay system 124 is then tasked with translation of the decentralized message request 134 for communication to the service provider system 108, an example of which is described in the following discussion.

Figure 5:
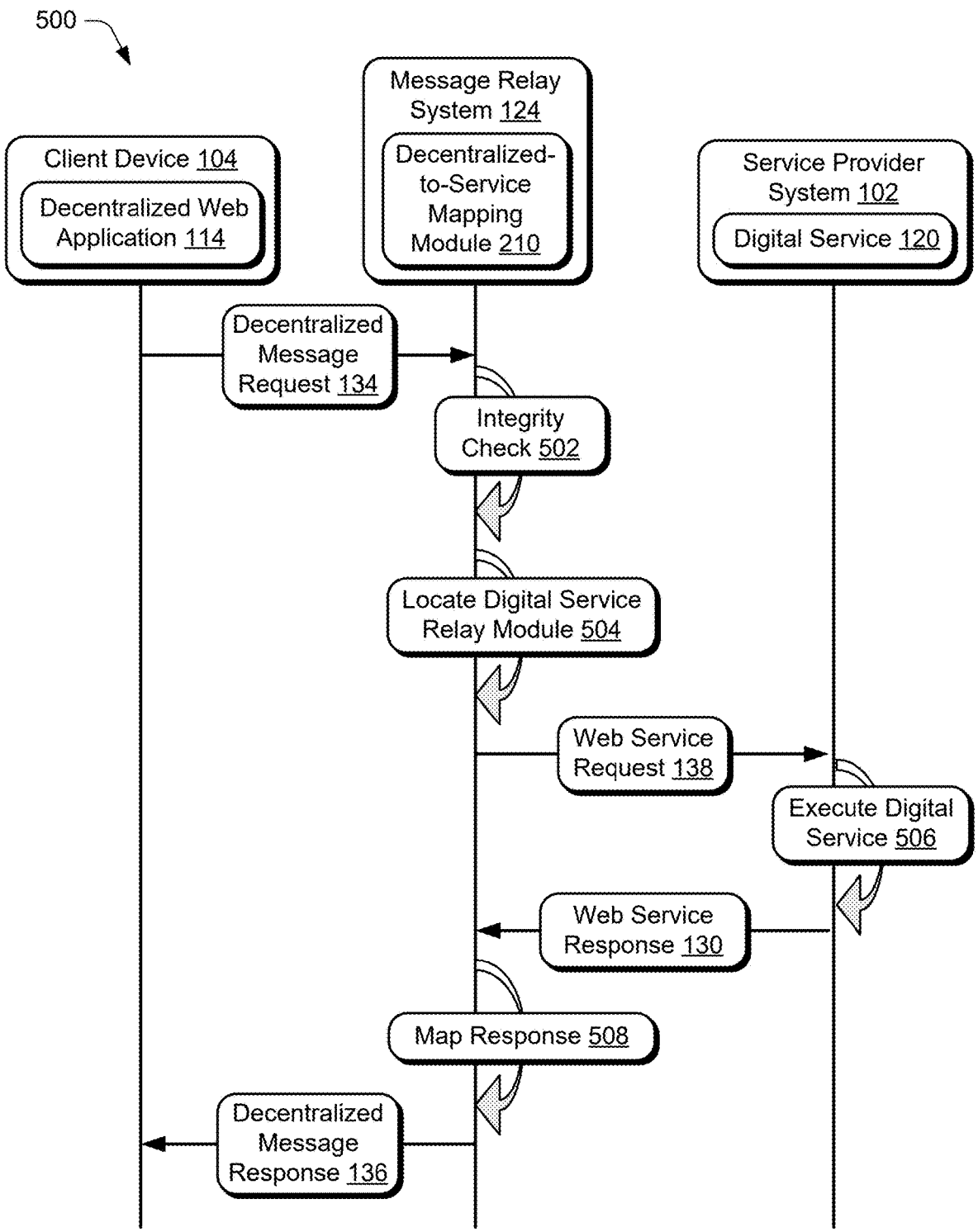
FIG. 5 is a non-limiting illustration of an example system showing a state diagram as implementing a message relay system to translate between a decentralized network schema utilized by a client device and a web transfer protocol utilized by a digital service as described herein according to an implementation of the present subject matter.

FIG. 5 is a non-limiting illustration of an example system 500 showing a state diagram as implementing a message relay system to translate between a decentralized network schema 128 utilized by a client device 104 and a web transfer protocol 130 utilized by a digital service 120 as described herein according to an implementation of the present subject matter. The system 500 includes a client device 104 having a decentralized web application 114, a message relay system 124 having a decentralized-to-service mapping module 210, and a decentralized network 102 exposing a digital service 120.

To begin in this example, the decentralized web application 114 of the client device 104 generates a decentralized message request 134, an example of which is included below for an "encode data" example:

```
{
    "descriptor": {
        "target": "did:example:alice",
        "recipient": "did:example:alice",
        "method": "CollectionsWrite",
        "protocol": "6f06bc3c-55ed-4c9f-bccf-1b4345363473",
        "contextId": "1",
        "schema": "CredentialApplication",
```

-continued

```
    "recordId": "aa36ec55-c59b-4f20-8143-10f74aac696d",
    "nonce": "AXwHbetCnCCy8Q1ZSWE5X9yH1RKZ5ZXO",
    "dataCid": "bafybeihuzogd3utvlrw7dr3rb4kgzu43vqhlorvpzex33prwyqb777si5e",
    "dateCreated": 1663632617121,
    "dataFormat": "application/json"
},
"authorization": {
    "payload":
"eyJkZXNjcmlwdG9yQ2lkIjoiYmFmeXJlaWVoaXVzZ214Y3Q0ejZieHg3emxsampyNzdybWdrN
WlzbWZta3Rlcm1oeW5qMnp3aGkzczQifQ",
    "signatures": [
        {
            "protected": "eyJhbGciOiJFUzI1NksiLCJraWQiOiJkaWQ6ZXhhbXBsZTpib2Ija2V5MSJ9",
            "signature":           "MEUCIQC1EC1A95c9Rs-0-_11QnJOcuedKEPwAgfmDRLK-
jVUYgIgd5agGdjriekepYLe94IXvdkID4lEiSTxqDgnF7SV8bs"
        }
    ]
},
"encodedData":
"eyAicmVxdWVzdGVyRGlkIjogImRpZDp1c2VyOjEyMyIsICJhcHBsaWNhdGlvbiI6IHsgImlkIjog
IjliMWRlYjRkLTNiN2QtNGJhZC05YmRkLTJiMGQ3YjNKY212ZCIsICJzcGVjX3ZlcnNpb24iOi
AiaHR0cHM6Ly9pZGVudGl0eS5mb3VuZGF0aW9uL2NyZWRlbnRpYWwtbWFuaWZlc3Qvc3Bl
Yy92MS4wLjAvIiwgIm1hbmlmZXN0X2lkIjogIldBLURMLUNMQVNTLUEiLCAiZm9ybWF0Ijo
geyAibGRwX3ZjIjogeyAicHJvb2ZfdHlwZSI6IFsgIkpzb25XZWJTaWduYXR1cmUyMDIwIiwgIk
VjZHNhU2VjcDI1NmsxU2lnbmF0dXJlMjAxOSIgXSB9IH0sICJwcmVzZW50YXRpb25fc3VibWl
zc2lvbiI6IHsgImlkIjogImEzMGUzYjkxLWZiNzctNGQyMi05NWZhLTg3MTY4OWMzMjJlMiIsI
CJkZWZpbml0aW9uX2lkIjogIjMyZjU0MTYzLTcxNjYtNDhmMS05M2Q4LWZmMjE3YmRiMD
Y1MyIsICJkZXNjcmlwdG9yX21hcCI6IFt7ICJpZCI6ICJpZDEiLCAiZm9ybWF0IjogImp3dF92YyI
sICJwYXRoIjogIiQudmVyaWZpYWJsZUNyZWRlbnRpYWxbMF0iIH1dIH0gfSB9"
}
```

Continuing with the example of FIG. 4, the client device 104 resolves the digital service decentralized ID 306 to the node 112 of the decentralized network 102. The decentralized message request 134 is then communicated to the node 112 associated with the message relay system 124. The message relay system 124 performs an integrity check 502 on the decentralized message request 134, e.g., to ensure compliance with the decentralized network schema 128, the client device 104 "is who they say they are" through verification of a client identifier (e.g., a decentralized identifier associated with the client device 104), and so on.

The message relay system 124 then locates a digital service relay module 504 that corresponds to the decentralized message request 134, e.g., that is associated with the digital service decentralized ID 306. The digital service relay module 504 is used to translate the decentralized message request 134 into a digital service request 138 compatible with the service provider system 108, an example of which is described in greater detail in the following discussion.

Figure 6:
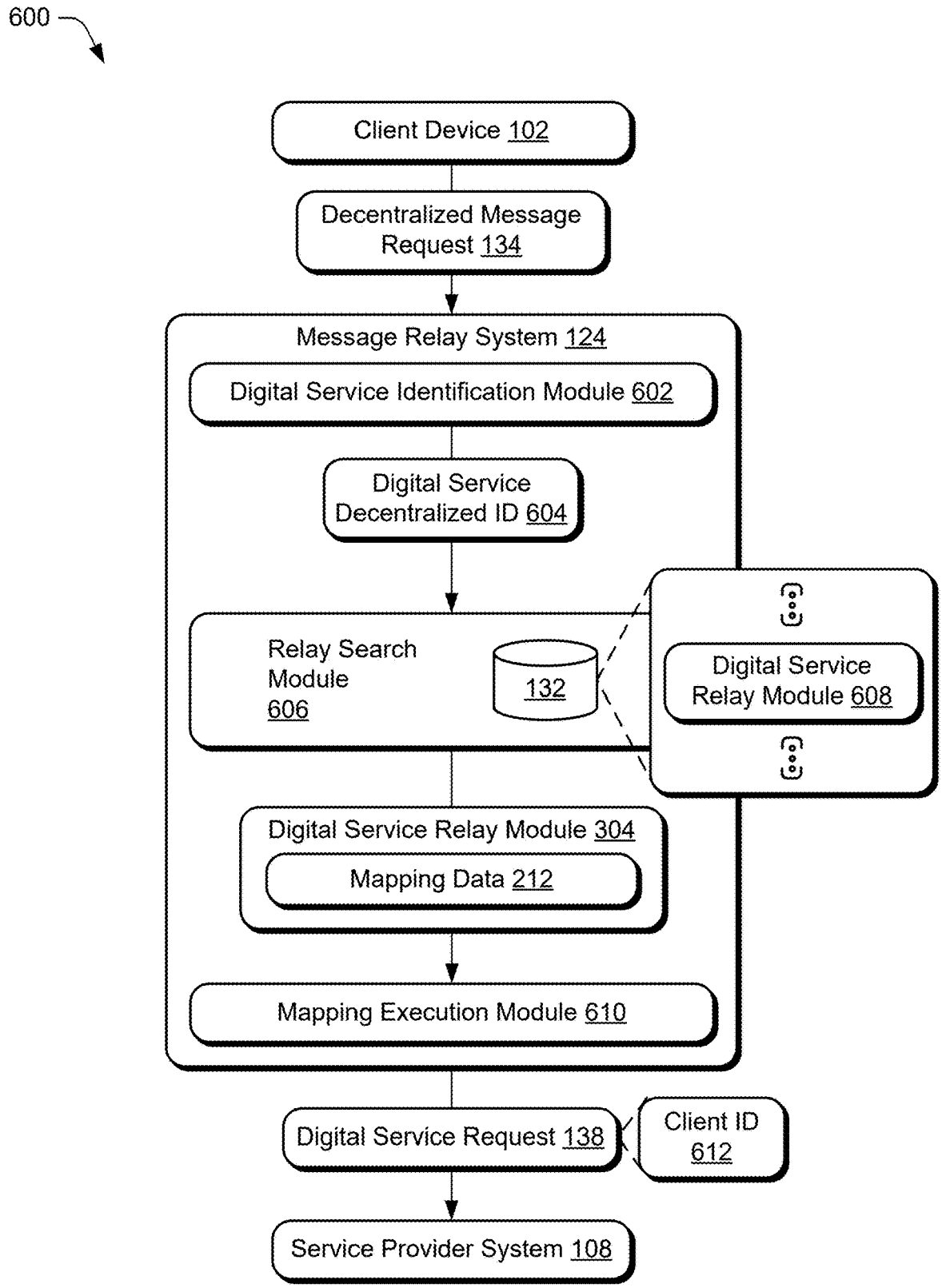
FIG. 6 is a non-limiting illustration of an example system showing operation of a message relay system in greater detail as translating a decentralized message request that is compatible with a decentralized network schema into a digital service request compatible with a web transfer protocol as described herein according to an implementation of the present subject matter.

FIG. 6 is a non-limiting illustration of an example system 600 showing operation of a message relay system in greater detail as translating a decentralized message request that is compatible with a decentralized network schema into a digital service request compatible with a web transfer protocol as described herein according to an implementation of the present subject matter. A client device 104 in this example transmits a decentralized message request 134 to the message relay system 124.

A digital service identification module 602 parses the decentralized message request 134 to identify a digital service decentralized ID 604 included in the request. A relay search module 606 is then used to locate the digital service relay module 304 from a plurality of digital service relay modules 608, e.g., as maintained in a storage device 132. To do so, the relay search module 606 uses the digital service decentralized ID 604 as an index to locate the digital service relay module 304 associated with that identifier. In an implementation, each of the plurality of digital service relay modules 608 corresponds with a respective digital service, whether maintained on a same or different service provider system. Accordingly, the relay search module 606 is usable to locate the digital service relay module 304 that corresponds to the digital service involved in the decentralized message request 134.

The digital service relay module 304, once located, is utilized by a mapping execution module 610 of the message relay system 124 to translate the decentralized message request 134 into a digital service request 138 that is compatible with the digital service 120. The mapping execution module 610, for instance, utilizes the map data 212 to map properties included in the decentralized message request 134 into a form that is compatible with the web transfer protocol 130. In an implementation, a client ID 612 is included within the digital service request 138 to identify an originator of the decentralized message request 134, and therefore the digital service request 138. The digital service request 138 is then communicated via the network 110 to the service provider system 108.

Continuing with the example above, the digital service relay module 304 is configured to decode the "encode data" property from the above message as follows:

```
{
    "requesterDid": "did:user: 123",
    "application": {
        "id": "9b1deb4d-3b7d-4bad-9bdd-2b0d7b3dcb6d",
        "spec_version": "https://identity.foundation/credential-
manifest/spec/v1.0.0/",
        "manifest_id": "WA-DL-CLASS-A",
        "format": {
            "ldp_vc": {
                "proof_type": [
                    "JsonWebSignature2020",
                    "EcdsaSecp256k1Signature2019"
                ]
            }
```

```
        },
        "presentation_submission": {
            "id": "a30e3b91-fb77-4d22-95fa-871689c322e2",
            "definition_id": "32f54163-7166-48f1-93d8-ff217bdb0653",
            "descriptor_map": [
                {
                    "id": "id1",
                    "format": "jwt_vc",
                    "path": "$.verifiableCredential[0]"
                }
            ]
        }
    }
}
```

Returning again to FIG. 5, the digital service request 138 is communicated from the message relay system 124 to the digital services 120 of the decentralized network 102, e.g., to a respective application programming interface. The digital service 120 is then executed 506 to generate a response, e.g., to obtain digital content, perform a resource transfer, and so on. A digital service response 140 is then generated by the service provider system 108, which is then communicated back to the "bridge" implemented by the message relay system 124. The message relay system 124 maps the response 508 into a decentralized message response 136 that is communicated back to the client device 104 in compliance with the decentralized network schema 128, which continuing with the above example includes for a response mapping property having a following configuration:

```
{
    "handlers": [
        {
            "filter": {
                "method": "CollectionsWrite",
                "schema": "https://ssi-schemas.org/CredentialApplication",
                "protocol": ""
            },
            "endpoint": {
                "method": "POST",
                "url": "https://somehost/some-endpoint",
                "responseMapping": {
                    "201": {
                        "method": "CollectionsWrite",
                        "schema": "https://ssi-schemas.org/CredentialApplication"
                    }
                }
            }
        }
    ]
}
```

A body of the response is therefore configurable as follows:

```
{
    "response": {
        "id": "536eda73-b89f-4aef-8235-292c7c03ae85",
        "spec_version": "https://identity.foundation/credential-manifest/spec/v1.0.0/",
        "manifest_id": "WA-DL-CLASS-A",
        "application_id": "9b1deb4d-3b7d-4bad-9bdd-2b0d7b3dcb6d",
        "fulfillment": {
            "descriptor_map": [
                {
                    "id": "id1",
                    "format": "jwt_vc",
                    "path": "$.verifiableCredential[0]"
```

```
                }
            ]
        }
    },
    "credentials": [
        {
            "@context": [
                "https://www.w3.org/2018/credentials/v1"
            ],
            "id": "a4a9e17b-b865-4cae-8085-ceb5584c18ea",
            "type": [
                "VerifiableCredential"
            ],
            "issuer": "did:example: 123?linked-domains=3",
            "issuanceDate": "2022-09-23T20:15:18Z",
            "credential Subject": {
                "id": "did:user:123"
            }
        }
    ]
}
```

The message relay system 124 then evaluates the response against an appropriate mapping and constructs a message for communication to the client device 104 in compliance with the decentralized network schema 128, an example of which is described in the following discussion and shown in a corresponding figure.

Figure 7:
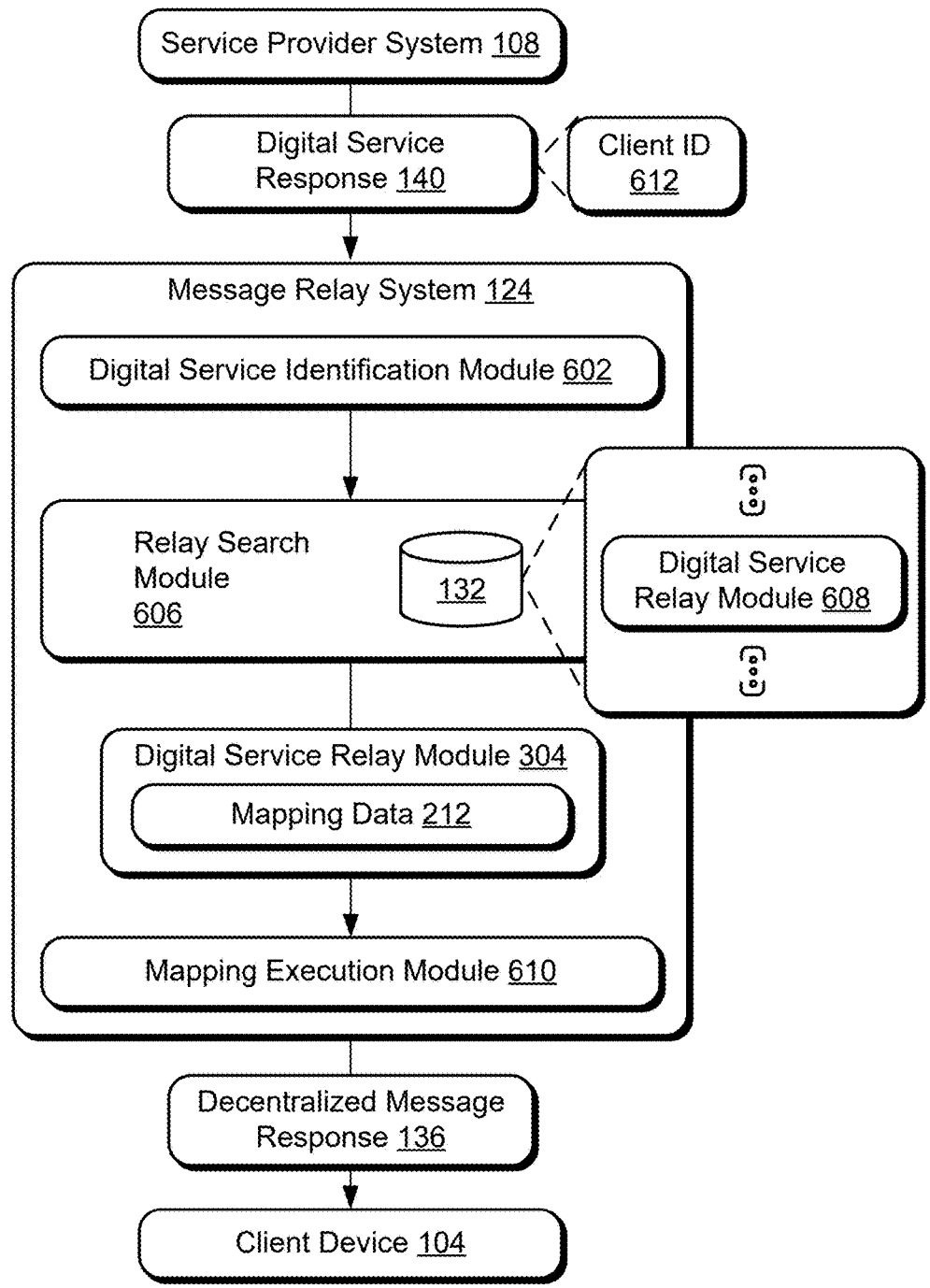
FIG. 7 is a non-limiting illustration of an example system showing operation of a message relay system in greater detail as translating a digital service response that is compatible with a web transfer protocol into a decentralized message response that is compatible with a decentralized network schema as described herein according to an implementation of the present subject matter.

FIG. 7 is a non-limiting illustration of an example system 700 showing operation of a message relay system in greater detail as translating a digital service response that is compatible with a web transfer protocol into a decentralized message response that is compatible with a decentralized network schema as described herein according to an implementation of the present subject matter. A service provider system 108 in this example transmits a digital service response 140 to the message relay system 124 in response to the digital service request 138 received from the message relay system 124 in FIG. 6.

The digital service identification module 602, as before, parses the digital service response 140 to identify the digital service, e.g., using a decentralized identifier, header information included in the digital service response 140, and so on. A relay search module 606 is then used to locate the digital service relay module 304 from a plurality of digital service relay modules 608, e.g., as maintained in a storage device 132. Accordingly, the relay search module 606 is usable to locate the digital service relay module 304 that corresponds to the digital service involved in the decentralized message request 134.

The digital service relay module 304, once located, is utilized by a mapping execution module 610 of the message relay system 124 to translate the digital service response 140 into a decentralized message response 136 that is compatible with the client device 104, and more particularly the decentralized network schema 128. The mapping execution module 610, for instance, utilizes the mapping data 212 to map properties included in the digital service response 140 into a form that is compatible with the decentralized network schema 128. The digital service request 138 is then communicated via the network 110 to the client device 104, e.g., based on the client ID 612. In this way, the message relay system 124 supports standardization between the decentralized network schema 128 and the web transfer protocol 130 to provide message access, which is not possible in conventional systems.

Figure 8:
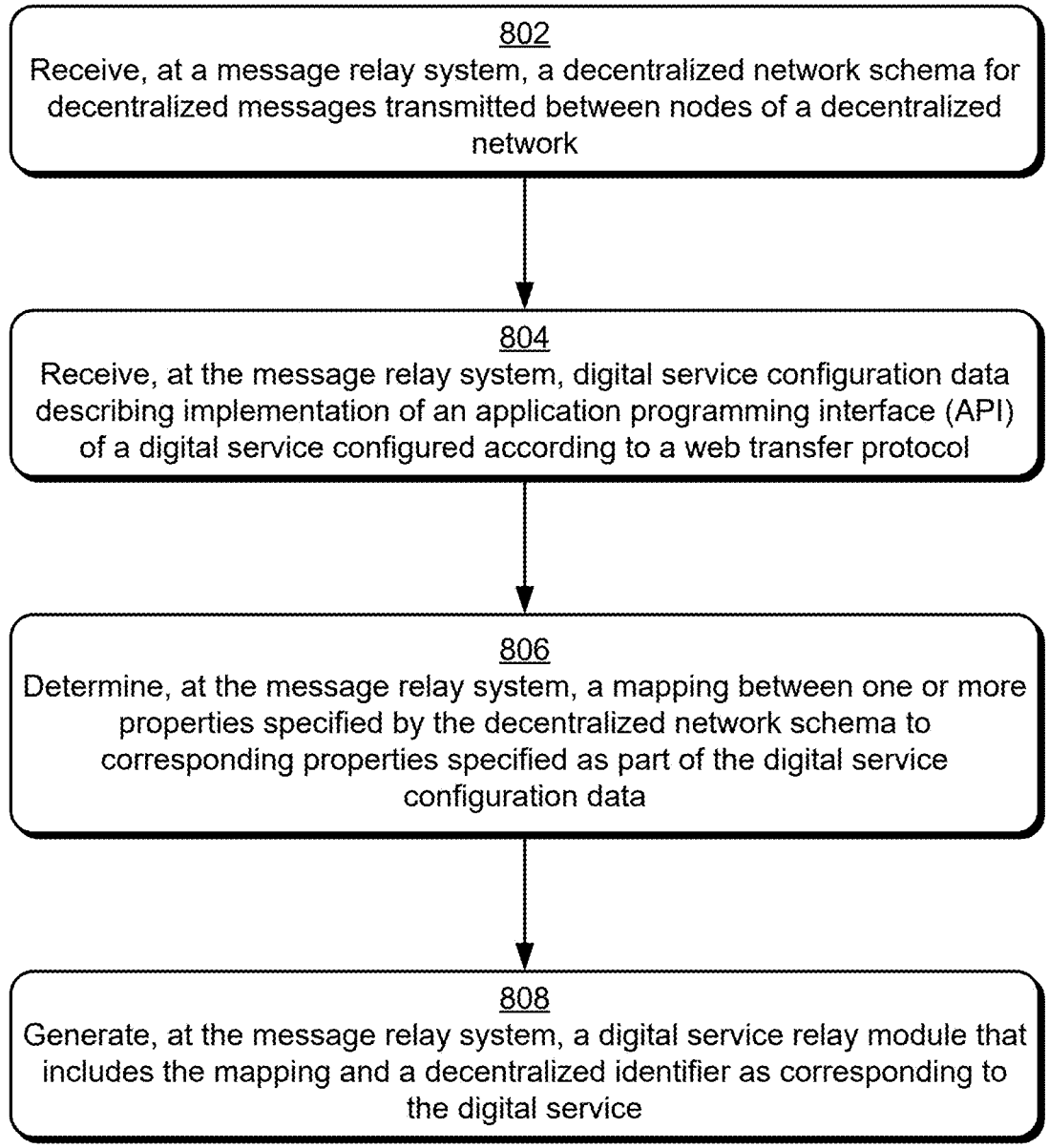
FIGS. 8 and 9 are flow diagrams depicting a step-by-step procedure in an example implementation of operations performable by a processing device for accomplishing a result of message relay between a decentralized network schema and a web transfer protocol as described herein according to an implementation of the present subject matter.
Figure 9:
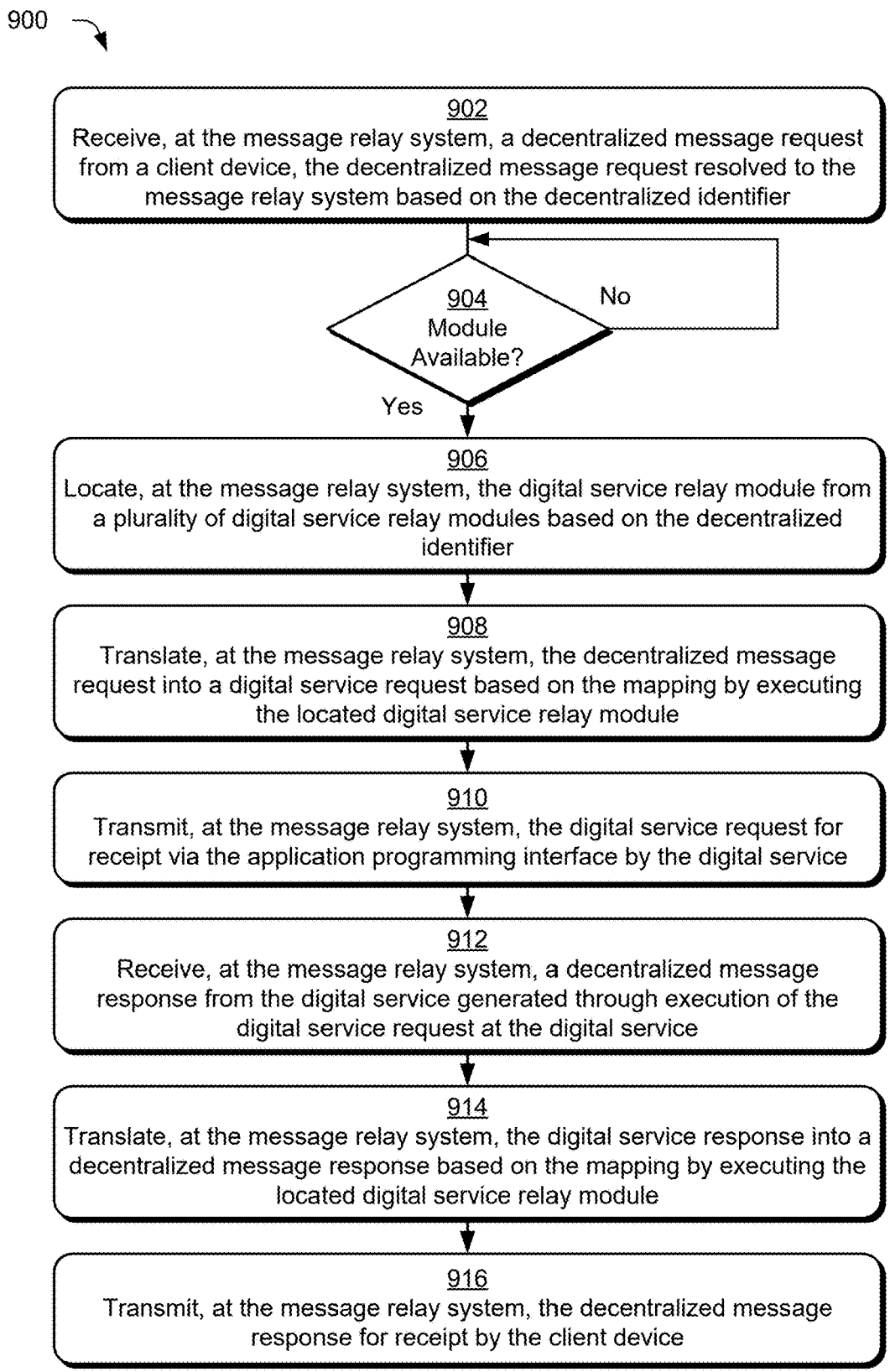

FIGS. 8 and 9 are flow diagrams 800, 900 depicting a step-by-step procedure in an example implementation of operations performable by a processing device for accomplishing a result of message relay between a decentralized network schema and a web transfer protocol as described herein according to an implementation of the present subject matter.

The following discussion describes decentralized-to-digital service relay techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

A decentralized network schema 128 is received at the message relay system 124 from the decentralized network 102. The decentralized network schema 128 describes properties for how decentralized messages are to be transmitted between nodes of a decentralized network (block 802).

Service protocol configuration data is also received at the message relay system 124. The service protocol configuration data describes implementation of an application programming interface (API) of a digital service 120 configured according to a web transfer protocol 130 (block 804).

The message relay system 124 (e.g., through use of a decentralized-to-service mapping module 210) determines a mapping 126 between one or more properties specified by the decentralized network schema 128 to corresponding properties specified as part of the service protocol configuration data (block 806), e.g., of the web transfer protocol 130.

The decentralized-to-service mapping module 210 then generates, at the message relay system, a digital service relay module 304 that includes the mapping 126 (e.g., as mapping data 212) and a decentralized identifier as corresponding to the digital service (block 808), e.g., as a digital service decentralized ID 306.

The message relay system 124 then receives decentralized message request 134 from the client device 104. The decentralized message request 134 was resolved to the message relay system 124 based on the decentralized identifier (block 902), e.g., using a DID resolver module 404 as described in relation to FIG. 4.

A determination is then made by the message relay system 124 as to whether a digital service relay module is available (decision block 904). If not ("no" from decision block 904), an error message is returned. If so ("yes" from decision block 904), the message relay system 124 locates the digital service relay module 304 from a plurality of digital service relay modules 608 based on the decentralized identifier (block 906), e.g., the digital service decentralized ID 604. The decentralized message request 134 is then translated into a digital service request 138 based on the mapping by executing the located digital service relay module 304 (block 908). Once translated, the digital service request 138 is transmitted for receipt via the application programming interface by the digital service 120 (block 910) of the service provider system 108.

Once the digital service request 138 is processed by a digital service 120 of the service provider system 108, a decentralized message response 136 is received from the digital service 120 that is generated through execution of the digital service request 138 at the digital service 120 (block 912). The digital service response 140 is translated by the message relay system 124 into a decentralized message response 136 based on the mapping 126 by executing the located digital service relay module 304 (block 914) and transmitted by the message relay system 124 for receipt by the client device 104 (block 916).

Decentralized Identifier Hash Table

A decentralized identifier is configured as a self-owned identifier that supports decentralized authentication and routing of identity within decentralized nodes (hereinafter referred to as "nodes") of a decentralized network. A self-owned identifier in a blockchain network is a unique identifier that is owned and controlled by an individual entity (e.g., on a blockchain), also referred to as a "self-sovereign identity," as contrasted with an entity controlled by a centralized authority (e.g., service provider system) that is vulnerable to attacks, hacks, and data breaches. Conventional identifiers such as email addresses and usernames, for instance, are typically issued and managed by centralized entities. A decentralized identifier, on the other hand, is created, owned and controlled by respective entities, themselves, without reliance on a centralized authority or intermediary system. The decentralized identifier is configurable without use of subjective consensus as implemented using a conventional centralized service provider, but rather is self-generated and self-owned.

Conventional techniques used to implement a decentralized identifier within a decentralized network, however, are not addressable. Awareness of a decentralized identifier, therefore, is limited in conventional techniques to manual sharing of the decentralized identifier between entities. For example, a first entity that wishes to locate data associated with a second entity in a conventional scenario (e.g., to transfer resources, send messages, collect public information about the entity, etc.) is tasked with contacting that entity to obtain a corresponding decentralized identifier of the second entity, which is then resolved to find a corresponding endpoint, at which, the data is located. If the entities do not have a preexisting relationship, for instance, the entities are forced in conventional scenarios to rely on a centralized search engine, thereby defeating advantages gained from use of a decentralized environment. Thus, the first entity is tasked with both first being aware of the second entity and then contacting the second entity to obtain the decentralized identifier. As a result, this limitation in awareness and addressability directly affects usability of the decentralized identifier as well as functionality that relies on these techniques, computational and network resources used to support this functionality, and so forth.

To address these and other technical challenges, techniques and systems are described that implement a decentralized hash table. The decentralized hash table includes hash table entries that are individually searchable to link index data as part of a search to locate a corresponding decentralized identifier. The index data, for instance, is configurable to describe an entity associated with a decentralized identifier, endpoint data maintained at an endpoint of a node that is resolvable based on the decentralized identifier, and so forth in accordance with a hash table schema. The hash table schema, for instance, supports standardization of a definition of the hash table entries, storage of the hash table entries, and how searches are performed for the hash table entries. In this way, the hash table schema overcomes conventional technical challenges encountered in unstandardized approaches to expand sharing and accessibility of decentralized identifiers.

The hash table entries may be generated in a variety of ways. A user interface, in one or more examples, is configurable to support user inputs to manually specify the index data. An entity associated with a decentralized identifier, for instance, may wish to publicize availability of music created by the entity as endpoint data at a node that is resolvable using the decentralized identifier. To do so, the entity interacts with the user interface to specify index data (e.g., the names of the songs) as associated with the decentralized identifier. A hash service system then generates a hash table entry based on this interaction, which is included as part of a decentralized hash table. Consequently, other entities that wish to locate this music may search the decentralized hash table (e.g., based on a comparison of text in a search query with the index data) to locate the hash table entry. A decentralized identifier (e.g., which may also include a decentralized document) is returned as a search result, which is then usable to locate the music at the endpoint implemented by the node within the decentralized network. In this way, entities associated with decentralized identifiers are provided with an ability to make other entities aware of the decentralized identifiers in a variety of ways, which is not possible in conventional techniques.

Additional functionality is also supported through use of the decentralized hash table, including an ability by a hash service system to crawl endpoints and index data available at those endpoints to form the decentralized hash table. Publication and subscription functionality is further supported in which entities subscribe to topics at a hash service system and receive publications generated using index data that are based on the topics. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Figure 10:
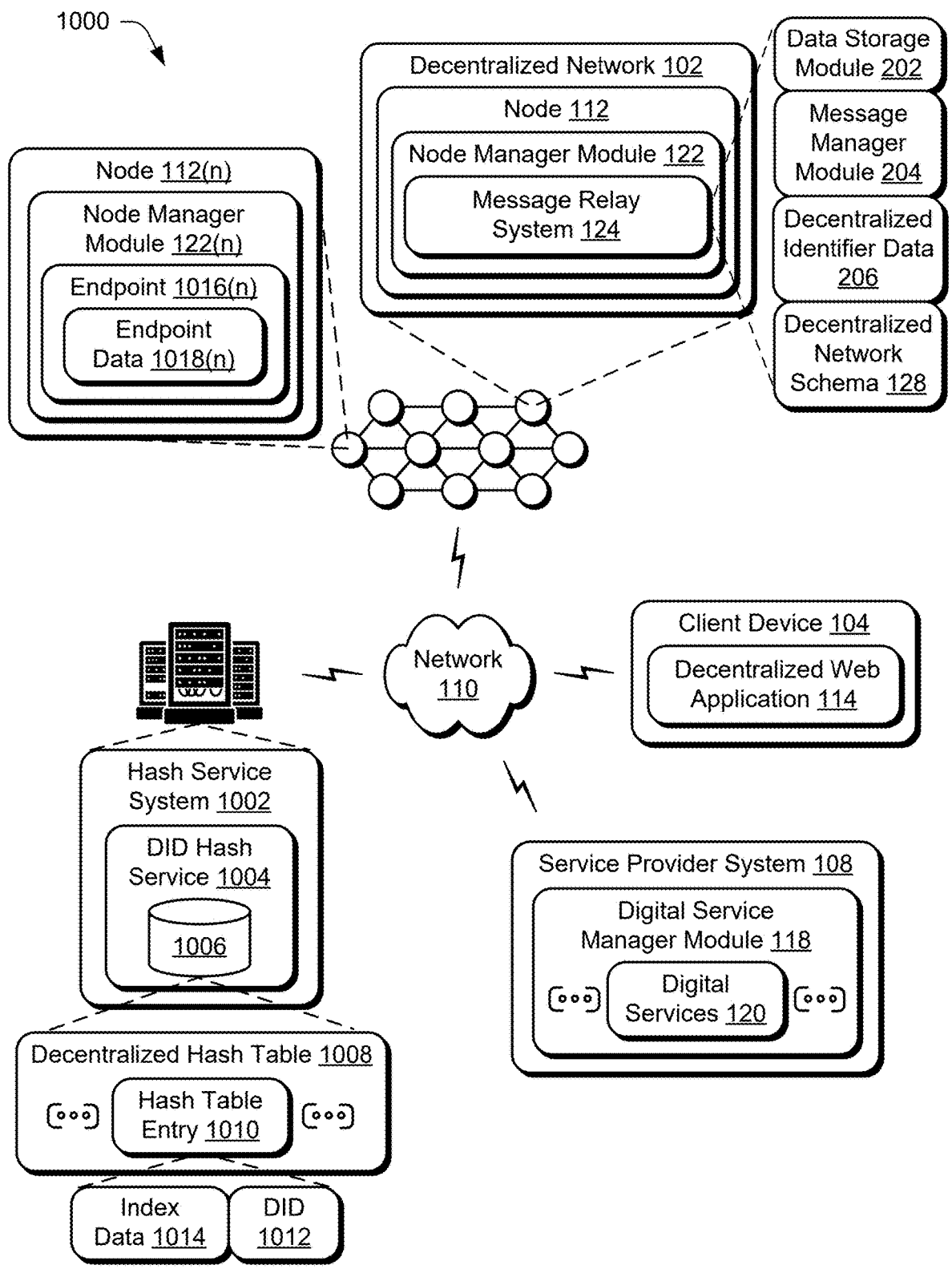
FIG. 10 is a non-limiting illustration of an example system showing operation of a decentralized hash table in a decentralized network of FIG. 1 in greater detail according to an implementation of the present subject matter.

FIG. 10 is a non-limiting illustration of an example system 1000 showing operation of a decentralized hash table in a decentralized network of FIG. 1 in greater detail according to an implementation of the present subject matter. As previously described in relation to FIGS. 1 and 2, the decentralized network 102 includes a node 112 having a node manager module 122 implementing a message relay system 124 and a storage device 132. The node 112 is representative of a computer or other device involved in implementation of a decentralized network, e.g., tasked with validating transactions and maintaining a copy of a blockchain ledger.

The node manager module 122 is configured to implement functionality in support of communication and message relay between the nodes 112 of the decentralized network 102 as well as with the client device 104 and service provider system 108 via the network 110. Examples of functionality to do so include a data storage module 202 and a message manager module 204. The data storage module 204 is configured to collect and maintain decentralized identifier data 206. The decentralized identifier data 206 is formatted in accordance with a decentralized network schema 128 to support decentralized authentication and routing as performed by the message manager module 204, e.g., for communication between nodes and/or with the service provider system 108.

The node 112 of the decentralized network 102, as representative of one of a plurality of decentralized nodes (e.g., decentralized web nodes), supports data storage and relays that allows entities, transaction systems, individuals, organizations and so forth to send, store, and receive encrypted or public messages and data. The node 112 is universally addressable and is "crawlable" using data addressing in relation to the decentralized identifiers. The node 112 is also configured to support decentralized replication of data across the nodes that is "eventually consistent" (e.g., the data is consistent across the nodes over time through continued data communication between the nodes) through communication of instances across individual nodes in the decentralized network 102. The node 112 supports secure encryption through use of a cryptographic key associated with an individual's decentralized identifier.

The client device 104 includes a decentralized web application 114 that is executable to support interaction with the decentralized network 102. The decentralized web application 114 is configurable in a variety of ways, such as to implement a "digital wallet" in support of cryptographic transactions, digital content access applications (e.g., digital content download and streaming applications), applications that support peer-to-peer transactions, and so forth.

The service provider system 108 includes a digital service manager module 118 that is configured to manage execution of one or more digital services 120. Digital services 120 are executable to implement a variety of functionality that is made accessible via a network 110, e.g., via a browser, network-enabled application, and so on. Examples of digital services 120 include resource transfer services (e.g., involving cryptographic tokens, cryptocurrency, fiat currency, and so on), peer-to-peer resource transfer services, digital content streaming and download services, social media services, content creation services, data storage services, website and webpage providers, and so forth. The system 1000 in the illustrated example further includes a hash service system 1002. The hash service system 1002 is configured to implement a decentralized identifier hash service (depicted as DID hash service 1004), e.g., as one or more digital services made available via the network 110. The DID hash service 1004, for instance, is configurable by the hash service system 1002 as a node in the decentralized network 102, as a standalone digital service as illustrated (e.g., as a third-party system available via the network 110), and so forth.

The DID hash service 1004 utilizes a storage device 1006 to maintain (i.e., store) a decentralized hash table 1008. The decentralized hash table 1008 includes a plurality of hash table entries, an example of which is depicted as hash table entry 1010. The decentralized hash table 1008, in one or more implementations, is configured as a data structure that defines an associative array that maps keys to values. Accordingly, the values are obtained based on a corresponding key, and a hash function used to implement the hash table supports an ability to map a plurality of keys to a single value. In this example, the hash table entry 1010 includes a decentralized identifier shown as DID 1012 in FIG. 10 as a value and index data 1014 as a corresponding key. The hash table entry 1010 is therefore usable by the DID hash service 1004 to locate the DID 1012 based on search performed using the index data 1014.

A node 112(n), for instance, includes a node manager module 122(n) having functionality as previously described to implement the node 112(n) as part of the decentralized network 102. The node manager module 122(*n*) implements an endpoint 1016(*n*), via which, endpoint data 1018(*n*) is made available, e.g., as part of processing by a respective digital service, managed in storage at the node 112(*n*), and so forth. The endpoint 1016(*n*) is associated with a decentralized identifier corresponding to an entity, e.g., a user, service provider system, item of digital content, etc.

Accordingly, in order to expand awareness of the endpoint data 1018(*n*) for access via the respective endpoint 1016(*n*), index data 1014 is generated. The index data 1014, for instance, describes an entity associated with the DID 1012, a username (e.g., of a peer-to-peer platform, digital music platform), demographic information, and so forth. In another instances the index data 1014 describes the endpoint data 1018(*n*) that is available via the endpoint 1016(*n*) at the associated node 112(*n*), e.g., digital content titles, data types, and so forth. The index data 1014 therefore is configurable to describe "who" is associated with the DID 1012, "what" data is available via the endpoint data 1018(*n*), "how" to access the data by resolving the DID 1012 using an associated DID document, and so forth. Further discussion of these and other examples is included in the following description and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 11:
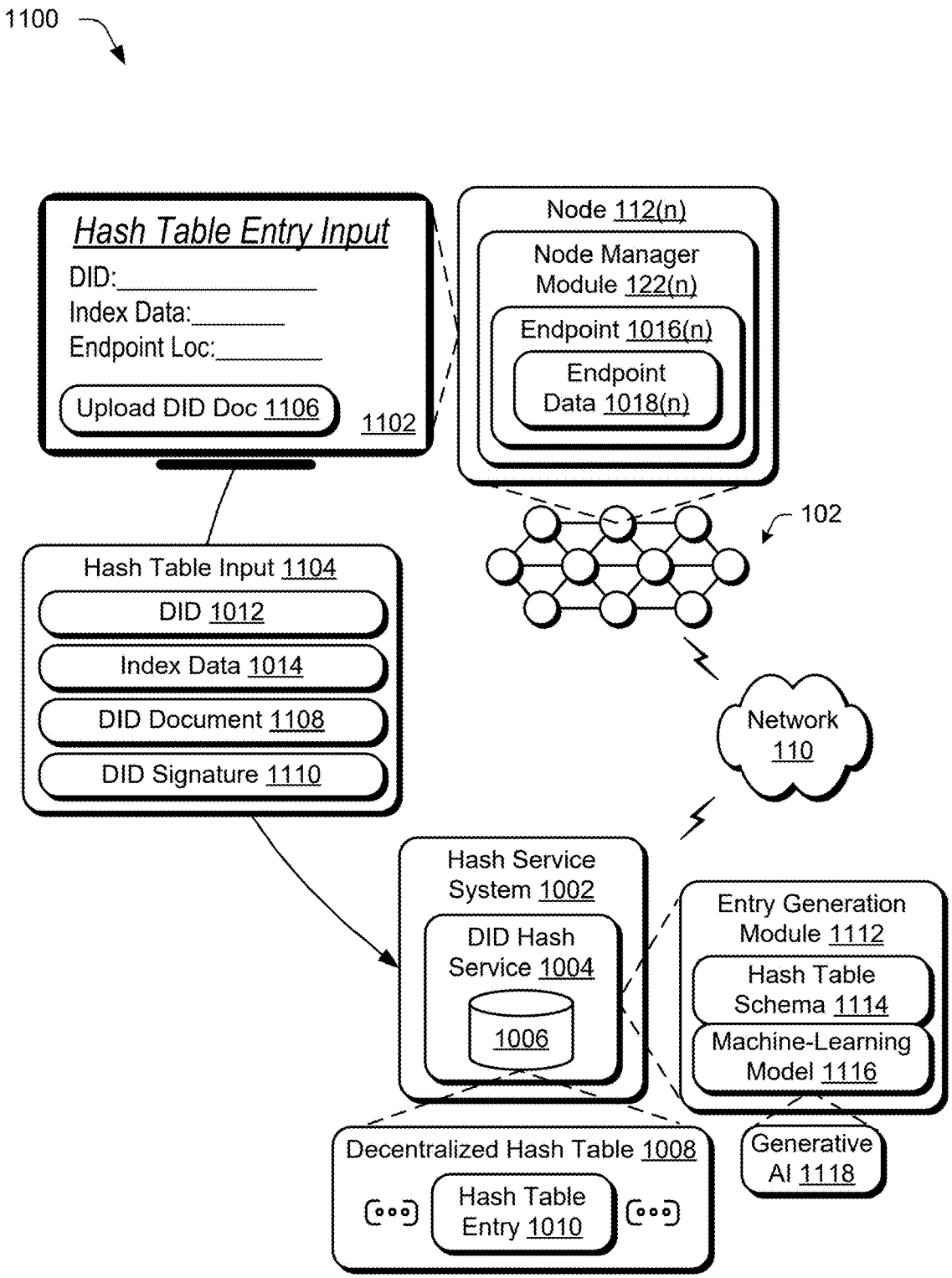
FIG. 11 is a non-limiting illustration of an example system showing generation of a hash table entry for inclusion as part of a decentralized hash table of FIG. 10 in a decentralized network through use of a user interface in greater detail according to an implementation of the present subject matter.

FIG. 11 is a non-limiting illustration of an example system 1100 showing generation of a hash table entry for inclusion as part of a decentralized hash table of FIG. 10 in a decentralized network in greater detail according to an implementation of the present subject matter. The node manager module 122(*n*) in this example is configured to output a user interface 1102, via which, user inputs are received to generate a hash table input 1104. The user interface 1102, for instance, may be received from the DID hash service 1004 (e.g., as part of a digital service) which is rendered and output by the node manager module 122(*n*).

The user interface 1102 includes a variety of options that are usable to specify data to be included in a hash table input 1104. Examples of these options include an option to enter a DID 1012, index data 1014, an endpoint location (e.g., directly or via an option 1106 to upload a DID document 1108), and so on. The DID document 1108 (i.e., decentralized identifier document) describes interaction supported by a respective DID 1012. The DID document 1108 is configurable to resolve the DID 1012 to locate a corresponding endpoint 1016(*n*) associated with the 1012, e.g., an endpoint location at a respective 112(*n*) in the decentralized network 102. The DID document 1108 is also configurable to include public keys used for cryptographic operations (e.g., authentication, encryption, digital signatures), identify authentical techniques usable to authenticate the DID 1012 (e.g., as associated with a particular entity), and so forth.

In this example, the hash table input 1104 further includes a DID signature 1110 as signed by a cryptographic key associated with the DID 1012. The DID signature 1110 is usable by the entry generation module 1112 to verify association of the hash table input 1104 with an entity that controls the DID 1012. In this way, the DID signature 1110 supports verification that the hash table input 1104 is received from a "correct" entity, i.e., the entity "is who they say they are."

The hash table input 1104 is received by the DID hash service 1004 of the hash service system 1002. An entry generation module 1112 is then employed to generate the hash table entry 1010 for inclusion in the decentralized hash table 1008. To do so, the entry generation module 1112 employs a hash table schema 1114. The hash table schema 1114 is configured to standardize an order and structure of the hash table entry 1010, such as to describe fields, relationships of the fields, how indexed, and other constructs. The hash table schema 1114 is also configurable to standardize a format for search queries and search results generated using the decentralized hash table 1008.

In an implementation, the entry generation module 1112 includes a machine-learning model 1116 to assist in generation of the hash table entry 1010, e.g., in accordance with the hash table schema 1114. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

The machine-learning model 1116, for instance, is configurable to employ generative AI 1118 (artificial intelligence) to generate the hash table entry 1010. To do so, the machine-learning model 1116 is trained and retrained using the hash table schema 1114 and positive and negative examples of hash table entries 1010 as part of training data. The machine-learning model 1116 is configured in one or more examples according to a transformer model architecture as a generative pretrained transformer to generate text based on an input.

To do so, the generative machine-learning model 1116 generates tokens to represent words or portions of words in the input, e.g., received via the user interface 1102 as the hash table input 1104. The tokens are then processed in order by generating a context that includes each of the tokens in the sequence before it as part of standardizing the hash table entry 1010 according to the hash table schema 1114. Accordingly, the machine-learning model 1116 as implementing generative AI 1118 in this example is trained and retrained using training data to implement standardization of the hash table schema 1114 as part of generating the hash table entry 1010, e.g., from natural language inputs included in the hash table input 1104. Thus, in this example an entity associated with the DID 1012 is given a degree of control into how the DID 1012 is addressable and therefore discoverable using corresponding index data 1014. The hash table entry 1010 may also be configured automatically and without user intervention by the 1002 itself, an example of which is described in the following discussion and shown in a corresponding figure.

Figure 12:
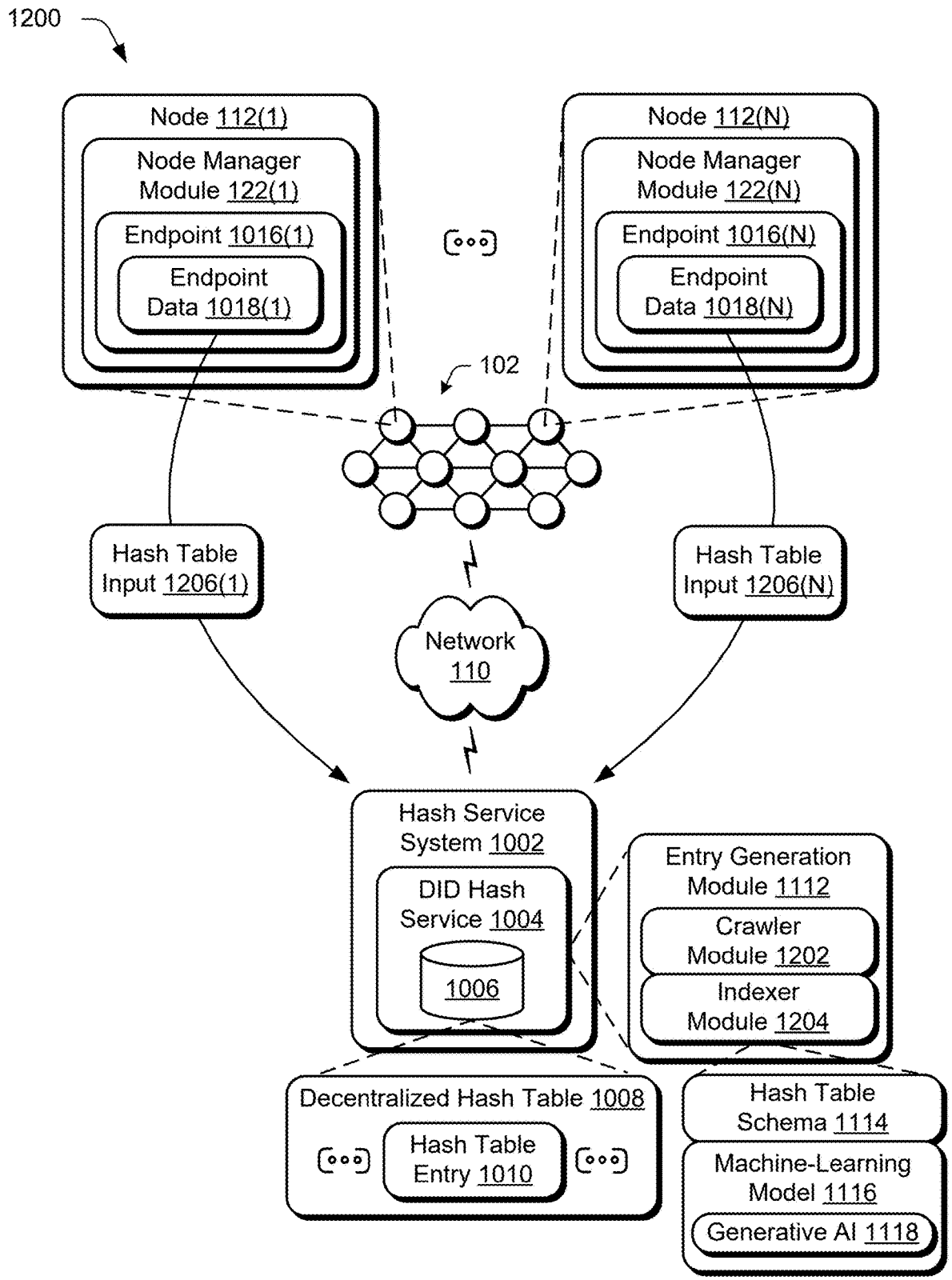
FIG. 12 is a non-limiting illustration of an example system showing generation of a hash table entry for inclusion as part of a decentralized hash table of FIG. 10 in a decentralized network through use of crawling and indexing functionality in greater detail according to an implementation of the present subject matter.

FIG. 12 is a non-limiting illustration of an example system 1200 showing generation of a hash table entry for inclusion as part of a decentralized hash table of FIG. 10 in a decentralized network through using a crawling and indexing functionality in greater detail according to an implementation of the present subject matter. The entry generation module 1112 in this example includes a crawler module 1202 and an indexer module 1204. The crawler module 1202 is configured to crawl endpoints in the decentralized network 102.

The illustrated example, for instance, includes a plurality of nodes, examples of which are represented as node 112(1), . . . , node 112(N). The nodes 112(1), 112(N) include corresponding node manager modules 122(1), 122(N) managing endpoints 1016(1), 1016(N) having associated endpoint data 1018(1), 1018(N). The crawler module 1202 is then implemented to "crawl" the decentralized network 102 to locate the endpoint data 1018(1), 1018(N) which is then used as a basis to generate the hash table entry 1010.

In one or more examples, the crawler module 1202 begins with "seed" decentralized identifiers, e.g., from the decentralized identifier data 206. The crawler module 1202 then locates the corresponding endpoints 1016(1), 1016(N) and "crawls" the endpoint data 1018(1), 1018(N), which is then used as a basis in this example to form the hash table inputs 1206(1), 1206(N) to generate corresponding hash table entry 1010.

To do so in this example, the indexer module 1204 indexes the data obtained via the hash table inputs 1206(1), 1206(N). The indexing is performable in a variety of ways, examples of which include in accordance with the hash table schema 1114, use of a machine-learning model 1116 and generative AI 1118 as previously described, and so on. In one or more implementation, the hash table entry 1010 is made available for query by the DID hash service 1004 via a REST API. The crawler module 1202 and the indexer module 1204 are configurable for a variety of types of decentralized network 102, endpoints 1016(1), 1016(N), and associated semantic data.

Entities, for instance, may wish to have corresponding decentralized identifiers to become discoverable using human-readable names. To do so, the hash table schema 1114 employs verifiable credential types as part of standardization which provide name/account information, e.g., for corresponding digital services 120. The entity, in one or more examples, creates a verifiable credential that contains a username (i.e., account identifier of the digital services 120) which is signed with a respective DID 1012. The crawler module 1202 discovers this data in this instance (e.g., by crawling the digital services 120) which is then indexed by the indexer module 1204 to form the index data 1014 included as part of the hash table entry 1010.

Figure 13:
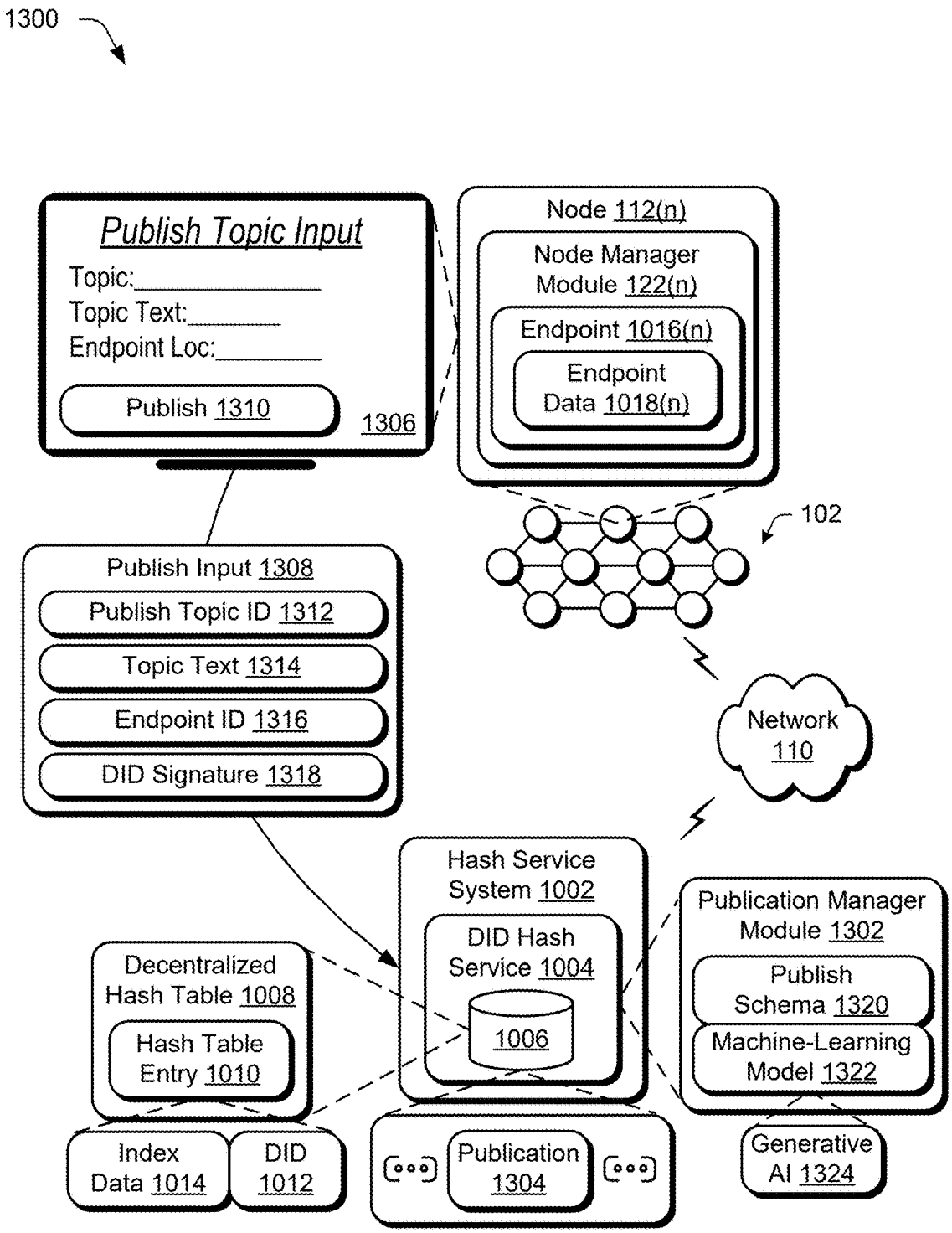
FIG. 13 is a non-limiting illustration of an example system showing publication functionality usable to leverage a decentralized hash table of FIG. 10 in a decentralized network according to an implementation of the present subject matter.

FIG. 13 is a non-limiting illustration of an example system 1300 showing publication functionality usable to leverage a decentralized hash table of FIG. 10 in a decentralized network according to an implementation of the present subject matter. In this example, the hash service system 1002 employs a publication manager module 1302 to generate a publication 1304 that is communicated to expand awareness of the decentralized hash table 1008 and more particularly endpoints that are locatable by DIDs associated with the endpoints.

The publication manager module 1302, for instance, includes functionality to define a topic to control dissemination of publications that are made in relation to that topic as well as an ability of entities to subscribe to those publications. In the illustrated example, the node manager module 122(n) of a node 112(n) having an endpoint 1016(n) associated with a DID 1012 displays a user interface 1306.

The user interface 1306 is configurable by the publication manager module 1302 as part of a digital service which is communicated to and displayed by a display device communicatively coupled to the node manager module 122(n).

The user interface 1306 includes options usable to generate a publish input 1308 to specify how publications are to be generated for the endpoint data 1018(n). The user interface 1306 also includes an option 1310 that is user selectable to initiate dissemination of the publication 1304 by the publication manager module 1302. Examples of data enterable via the user interface 1306 include a publish topic ID 1312 that defines an associated topic that is to be associated with the endpoint 1016(n), e.g., username associated with a digital service 120, digital music available, and so forth. The publish input 1308 also includes topic text 1314 describing a subject of the publish topic ID 1312, an endpoint ID 1316 of the 1016(n) (e.g., specified solely or as part of a DID document), and is signed as including a DID signature 1318. As before, the DID signature 1318 is usable to verify authenticity of the publish input 1308 as being associated with the entity having control of the DID 1012.

The publication manager module 1302 is also configurable to employ a publish schema 1320. The publish schema 1320 is configured to standardize an order and structure of the publication 1304, such as to describe fields, relationships of the fields, how indexed, and other constructs. The publish schema 1320 is also configurable to standardize a format for requests for subscription to the publications and how the publications are communicated to the subscribers.

In an implementation, similar to the entry generation module 1112 of FIG. 11, the publication manager module 1302 includes a machine-learning model 1322 to assist in generation of the publication 1304, e.g., in accordance with the publish schema 1320. The machine-learning model 1322, for instance, is configurable to employ generative AI 1324 (artificial intelligence) to generate the publication 1304. To do so, the machine-learning model 1322 is trained and retrained using the publish schema 1320 and positive and negative examples of publications as part of training data. The machine-learning model 1322 is configured in one or more examples according to a transformer model architecture as a generative pretrained transformer to generate text based on an input.

To do so, the machine-learning model 1322 generates tokens to represent words or portions of words in the input, e.g., received via the user interface 1306 as publish input 1308. The tokens are then processed in order by generating a context that includes each of the tokens in the sequence before it as part of standardizing the publication 1304 according to the publish schema 1320. Accordingly, the machine-learning model 1322 as implementing generative AI 1324 in this example is trained and retrained using training data to implement standardization of publish schema 1320 as part of generating the hash table entry publication 1304, e.g., from natural language inputs included in the publish input 1308. Thus, in this example an entity associated with the DID 1012 is given a degree of control into how awareness of the DID 1012 is achieved using the publication 1304. The publication 1304 is then available for dissemination in a variety of ways by the publication manager module 1302, an example of which is described as follows and shown in a corresponding figure.

Figure 14:
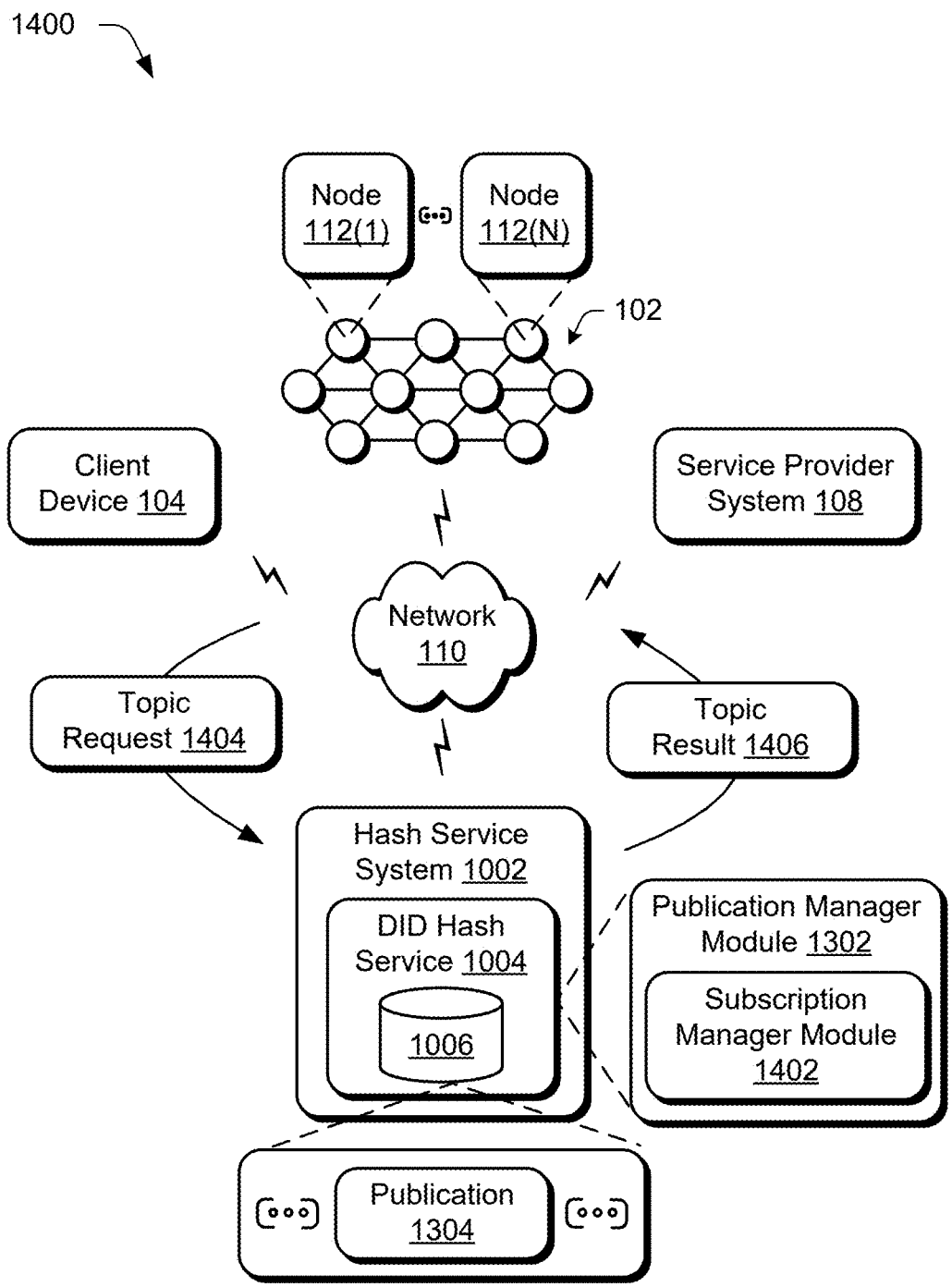
FIG. 14 is a non-limiting illustration of an example system showing subscription functionality to subscribe to publications of FIG. 13 as part of a decentralized hash table of FIG. 10 in a decentralized network according to an implementation of the present subject matter.

FIG. 14 is a non-limiting illustration of an example system 1400 showing subscription functionality to subscribe to publications of FIG. 13 as part of a decentralized hash table of FIG. 10 in a decentralized network according to an implementation of the present subject matter. The publication manager module 1302 in this example includes a subscription manager module 1402. The subscription manager module 1402 is configured to receive a topic request 1404 and generate a topic result 1406 having one or more publications 1304 that correspond to the topic request 1404.

The topic request 1404, for instance, is receivable from the client device 104, nodes 112(1)-112(N) of the decentralized network 102, the service provider system 108, and so forth. The topic request 1404 specifies topics of interest, which may be performed directly (e.g., by specifying a publish topic ID 1312) or indirectly, e.g., as a search query used to search index data 1014 used to generate the publication 1304 and/or the publication 1304 itself. Dissemination of the publication 1304 as part of the topic result 1406 may be performed in a variety of ways, such as at periodic intervals, responsive to analysis of "new" publication 1304 generated as a publish input 1308 is received by the publication manager module 1302, and so forth. Thus, the publication 1304 provides an additional mechanism to expand awareness of the DID 1012 of the decentralized hash table 1008 through use of a publication 1304.

Figure 15:
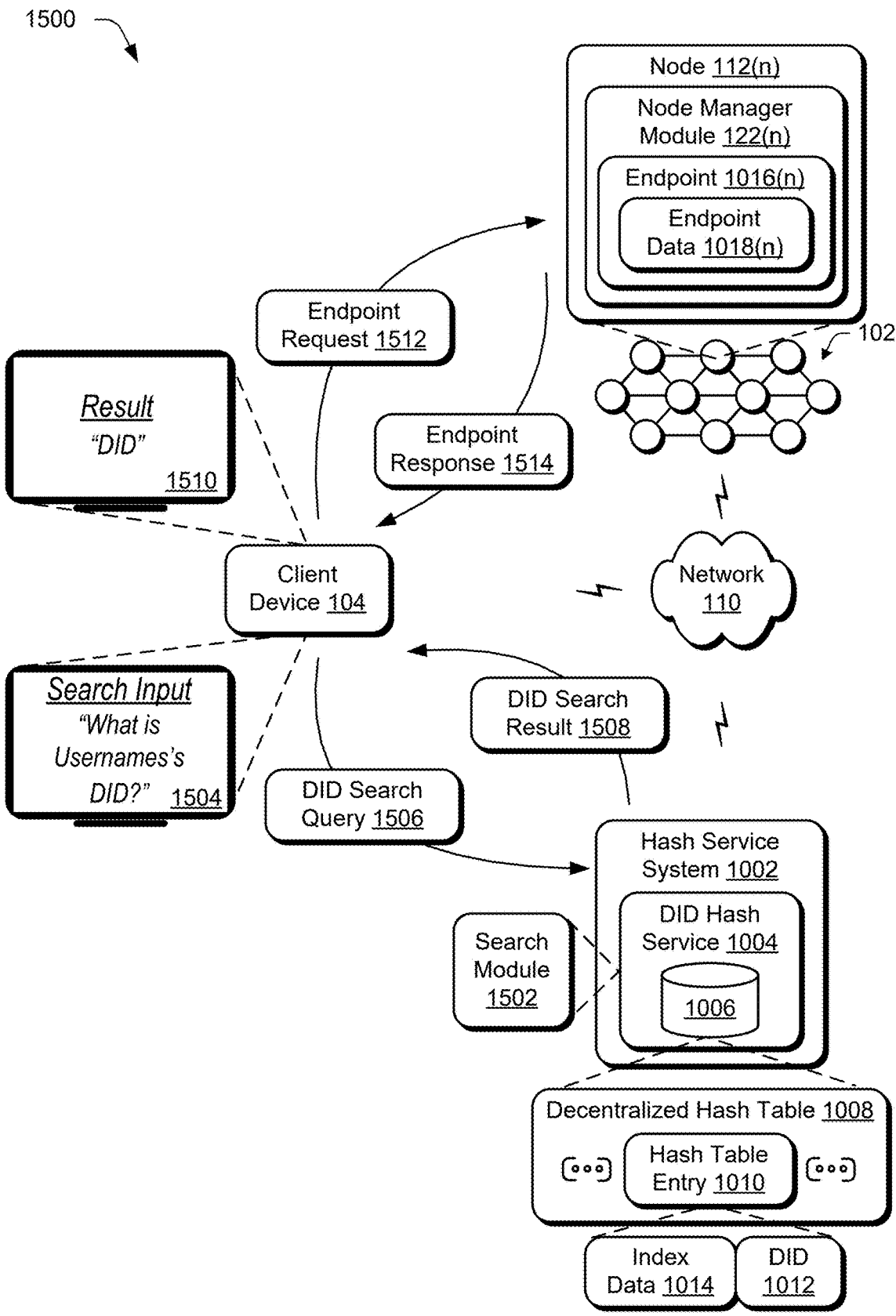
FIG. 15 is a non-limiting illustration of an example system showing search functionality employed as part of a decentralized hash table to locate decentralized identifiers and endpoints associated with an entity in a decentralized network according to an implementation of the present subject matter.

FIG. 15 is a non-limiting illustration of an example system 1500 showing search functionality employed as part of a decentralized hash table to locate decentralized identifiers and endpoints associated with an entity in a decentralized network according to an implementation of the present subject matter. The DID hash service 1004 includes a search module 1502 representative of search functionality usable to search index data 1014 of hash table entry 1010 to locate a DID 1012.

A client device 104, for instance, displays a user interface 1504. The user interface 1504 may be generated using a decentralized web application 114 (e.g., as a browser), as received from the DID hash service 1004 as implemented as a digital service, and so forth. User interaction with the user interface 1504 is used to generate a DID search query 1506, such as "What is Username's DID?" The DID search query 1506 is communicated from the client device 104 and received by the hash service system 1002. The search module 1502 then searches the index data 1014 (e.g., by comparing text in the DID search query 1506 to the index data 1014, natural language processing using machine learning, and so forth) to generate a DID search result 1508.

The DID search result 1508 is received by the client device 104, a representation of which is displayed in a user interface 1510. The client device 104 then initiates communication with the endpoint 1016(n) to obtain endpoint data 1018(n) via an endpoint request 1512 and an endpoint response 1514. In this way, the client device 104 is made aware of the DID 1012 using the decentralized hash table 1008, which is then usable to locate the endpoint 1016(n) at the node 112(n) in the decentralized network 102 to obtain additional information made available at the endpoint. This functionality is made possible through use of addressability and standardization of the hash table entry 1010 and the decentralized hash table 1008, which is not possible in conventional techniques.

Figure 16:
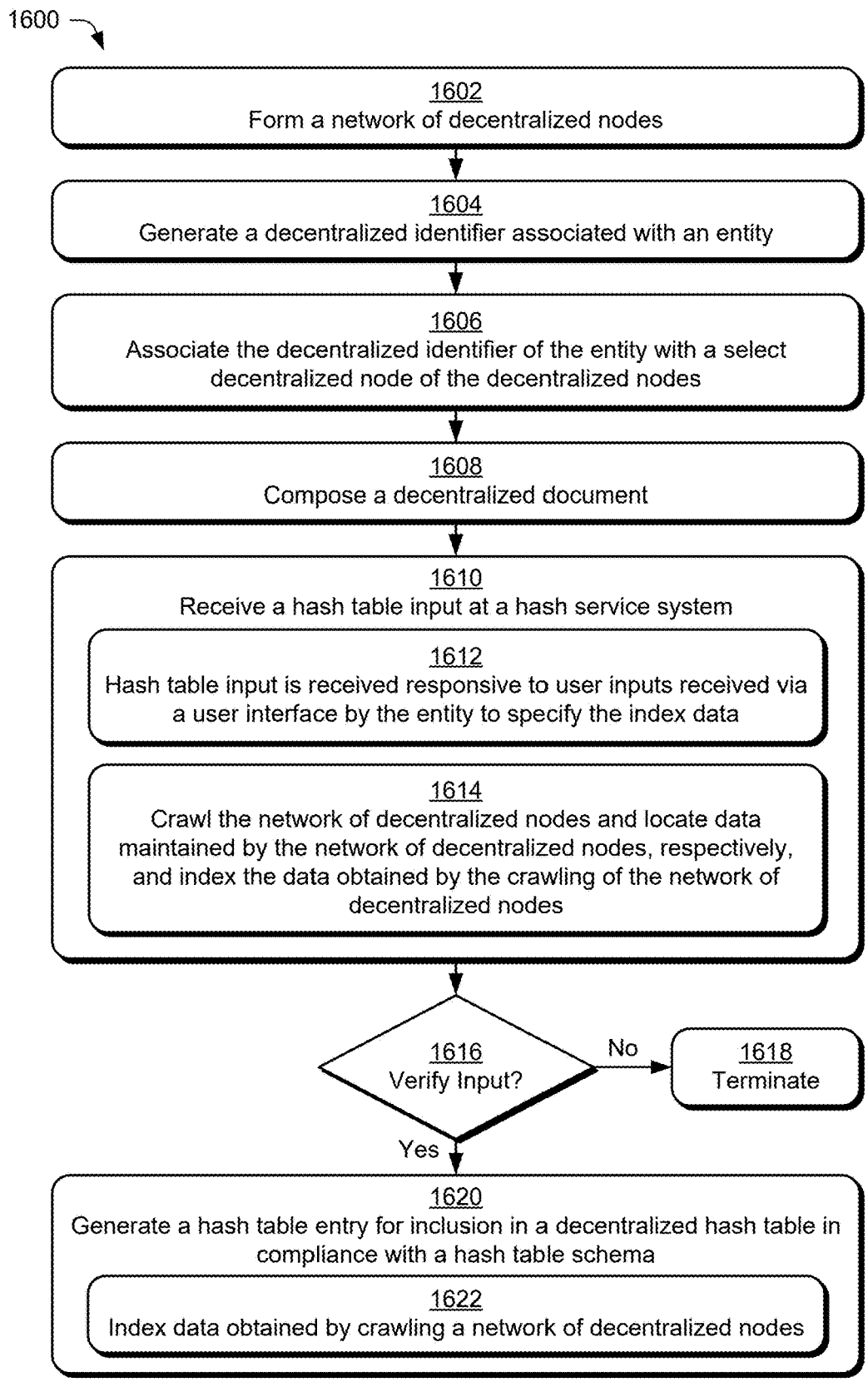
FIG. 16 is a flow diagram depicting a step-by-step procedure in an example implementation of operations performable by a processing device for accomplishing a result of generating a hash table entry for inclusion in a decentralized hash table as described herein according to an implementation of the present subject matter.

FIG. 16 is a flow diagram depicting a step-by-step procedure 1600 in an example implementation of operations performable by a processing device for accomplishing a result of generating a hash table entry for inclusion in a decentralized hash table as described herein according to an implementation of the present subject matter. To begin in this example, a network of decentralized nodes is formed that are individually configured to store, receive, and transmit data based on rules associated with the decentralized nodes (block 1602), e.g., as shown for node 112 and decentralized network 102. A decentralized identifier (e.g., DID 1012) is generated as associated with an entity (block 1604), e.g., entity 106.

The decentralized identifier (DID 1012) of the entity is associated with a select decentralized node (e.g., node 112(n)) of the decentralized nodes (block 1606), which may include generation of a DID document included as part of the decentralized identifier data 206 in compliance with a decentralized network schema 128. As part of generating the decentralized identifier, for instance, a decentralized document is configured to resolve the decentralized identifier to the select decentralized node (block 1608), e.g., to resolve DID 1012 to the node 112(n) using a DID resolver module 404 and decentralized identifier data 406 as described in relation to FIG. 4. Accordingly, at this point in the example the decentralized identifier is associated with the entity is configured to locate the endpoint and endpoint data located at the endpoint.

A hash table input 1104 is received at a hash service system 1002 to initiate generation of a hash table entry 1010. The hash table input 1104, in one or more examples, includes the decentralized identifier (e.g., DID 1012), index data 1014 configured to locate the decentralized identifier, a decentralized document (e.g., DID document 1108), and a signature as signed by a cryptographic key associated with the decentralized identifier (block 1610), e.g., illustrated as the DID signature 1110. In a first example, the hash table input 1104 is received in response to a user input received via a user interface 1102 by the entity to specify the index data 1014 (block 1612).

In a second example, the network of decentralized nodes is crawled by a crawler module 1202 to locate data (e.g., endpoint data 1018(1), 1018(N)) maintained by the network of decentralized nodes, respectively. An indexer module 1204 is then used to index the data obtained by the crawling of the network of decentralized nodes (block 1614), e.g., to form the index data 1014.

In an implementation, the hash service system 1002 verifies whether the hash table input corresponds to the entity based on the signature (decision block 1616), e.g., the DID signature 1110 as generated using a cryptographic key associated with the DID 1012 and specified in the DID document 1108. Verification is performed in this example to verify that the hash table input 1104 is received from an entity that is authorized to control the DID 1012. Responsive to unsuccessful verification of the hash table input ("no" from decision block 1616) by the hash service system 1002, the procedure 1600 terminates (block 1618), e.g., as protect from malicious parties and other unauthorized access.

Response to successful verification of the hash table input ("yes" from decision block 1616), a hash table entry 1010 is generated for inclusion in a decentralized hash table 1008 in compliance with a hash table schema 1114 (block 1620). In one or more examples, data obtained by crawling the network of decentralized nodes by the crawler module 1202 is indexed (block 1622) is indexed by the indexer module 1204 to form the index data 1014. The index data 1014 is then associated with the DID 1012 to form the hash table entry 1010. Use of a hash table schema 1114, machine-learning model 1116, and generative AI 1118 is also contemplated as part of generating the hash table entry 1010 as previously described in relation to FIG. 12. The hash table entry 1010, once generated as part of the decentralized hash table 1008, is usable in support of a variety of functionality, an example of which is described as follows.

Figure 17:
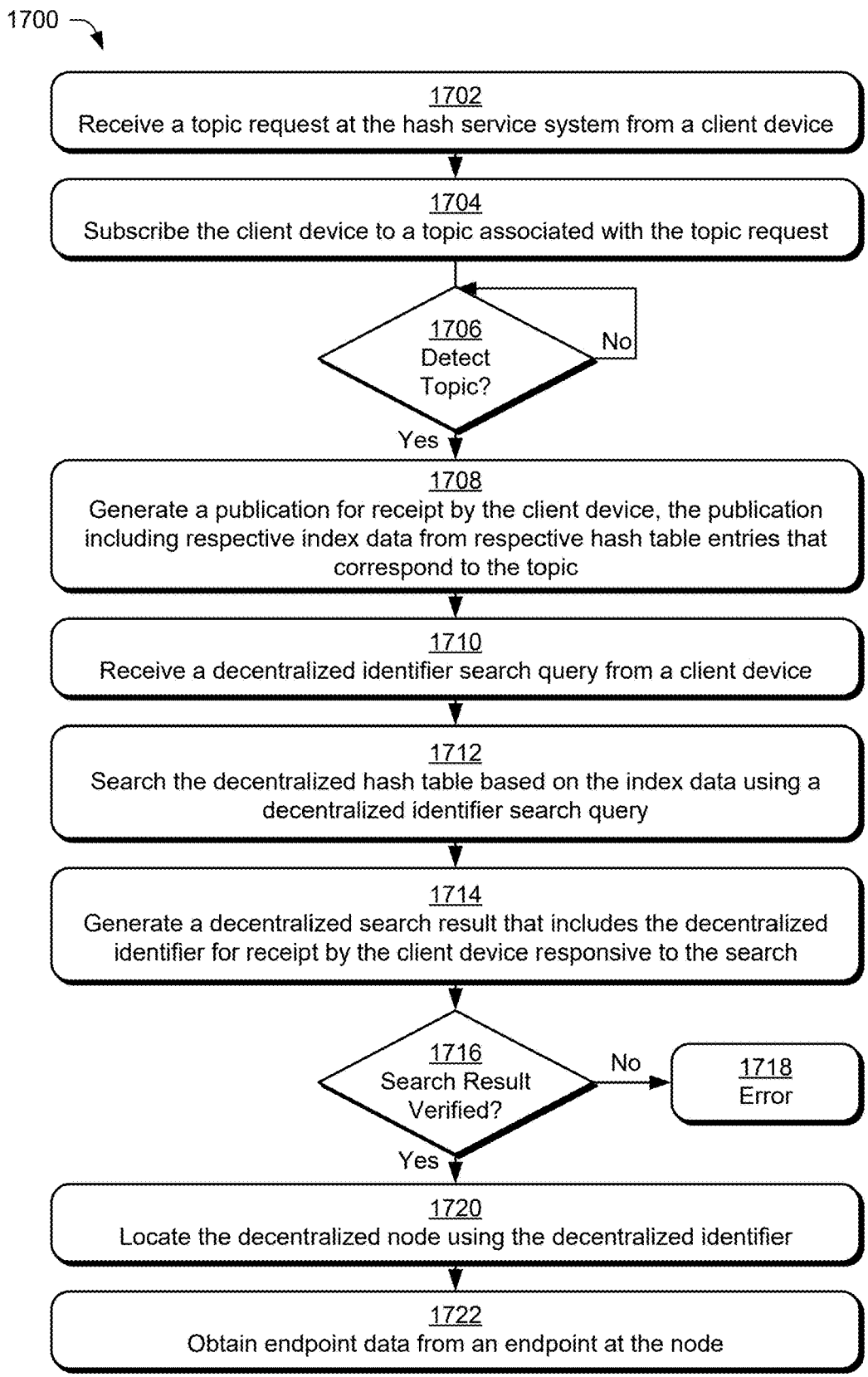
FIG. 17 is a flow diagram depicting a step-by-step procedure in an example implementation of operations performable by a processing device for accomplishing a result of generating a publication and a search result using a decentralized hash table as generated with respect to FIG. 16 and as described herein according to an implementation of the present subject matter.

FIG. 17 is a flow diagram depicting a step-by-step procedure 1700 in an example implementation of operations performable by a processing device for accomplishing a result of generating a publication and a search result using a decentralized hash table as generated with respect to FIG. 16 and as described herein according to an implementation of the present subject matter. Continuing with the previous example, a topic request 1404 is received at the hash service system 1002 (block 1702), e.g., from the client device 104. The client device 104, in response, is subscribed by the publication manager module 1302 to a topic associated with the topic request (block 1704).

A determination is then made as to whether the topic is detected (decision block 1706) in event data included in the decentralized hash table. The publication manager module 1302, for instance, is configurable to examine the decentralized hash table 1008 at periodic intervals, as hash table entries are generated, and so on. If not ("no" from decision block 1706), the determination continues. If so ("yes" from decision block 1706), a publication 1304 is generated for receipt by the client device 104. The publication 1304 includes respective index data 1014 from respective hash table entries 1010 that correspond to the topic (block 1708). A topic for "new music by artist X," for instance, causes communication of a publication 1304 indicating availability of the music at a respective endpoint through use of the publication 1304.

Continuing with the publication example, a decentralized identifier search query 1506 is received by the search module 1502 of the hash service system 1002 from the client device 104 (block 1710). A search of the decentralized hash table is performed based on the index data using the decentralized identifier search query (block 1712). The search module 1502, for example, performs a search of the decentralized hash table 1008 to locate a DID 1012 based on the index data 1014, e.g., as indicating the availability of the new music form a particular artist. A decentralized search result (e.g., DID search result 1508) is then generated that includes the decentralized identifier (e.g., DID 1012) based on the hash table entry 1010 responsive to the search (block 1714).

In an implementation, the client device verifies whether the decentralized search result corresponds to the entity based on the signature as included in the decentralized search result (decision block 1716). The client device 104, for example, is configured to examine the DID search result 1508 to determine whether a signature included in the index data 1014 (e.g., DID signature 1110) corresponds to the desired entity, e.g., through verification using cryptographic keys associated with the DID document 1108. If verification fails ("no" from decision block 1718), an error is output.

If verification succeeds ("yes" from decision block 1716), the select decentralized node is located within the network of decentralized nodes using the decentralized identifier associated with the entity (block 1720). The client device 104, for instance, resolves a DID 1012 included in the DID search result 1508. In another example, the DID search result 1508 includes the DID document and is therefore resolvable directly using the document to find the node 112(*n*). Endpoint data 1018(*n*) is obtained from an endpoint 1016(*n*) associated with the entity at the select decentralized node (block 1722), e.g., node 112(*n*).

In this way, the hash service system 1002 through use of the decentralized hash table 1008 supports standardization and addressability that is not possible in conventional techniques.

Figure 18:
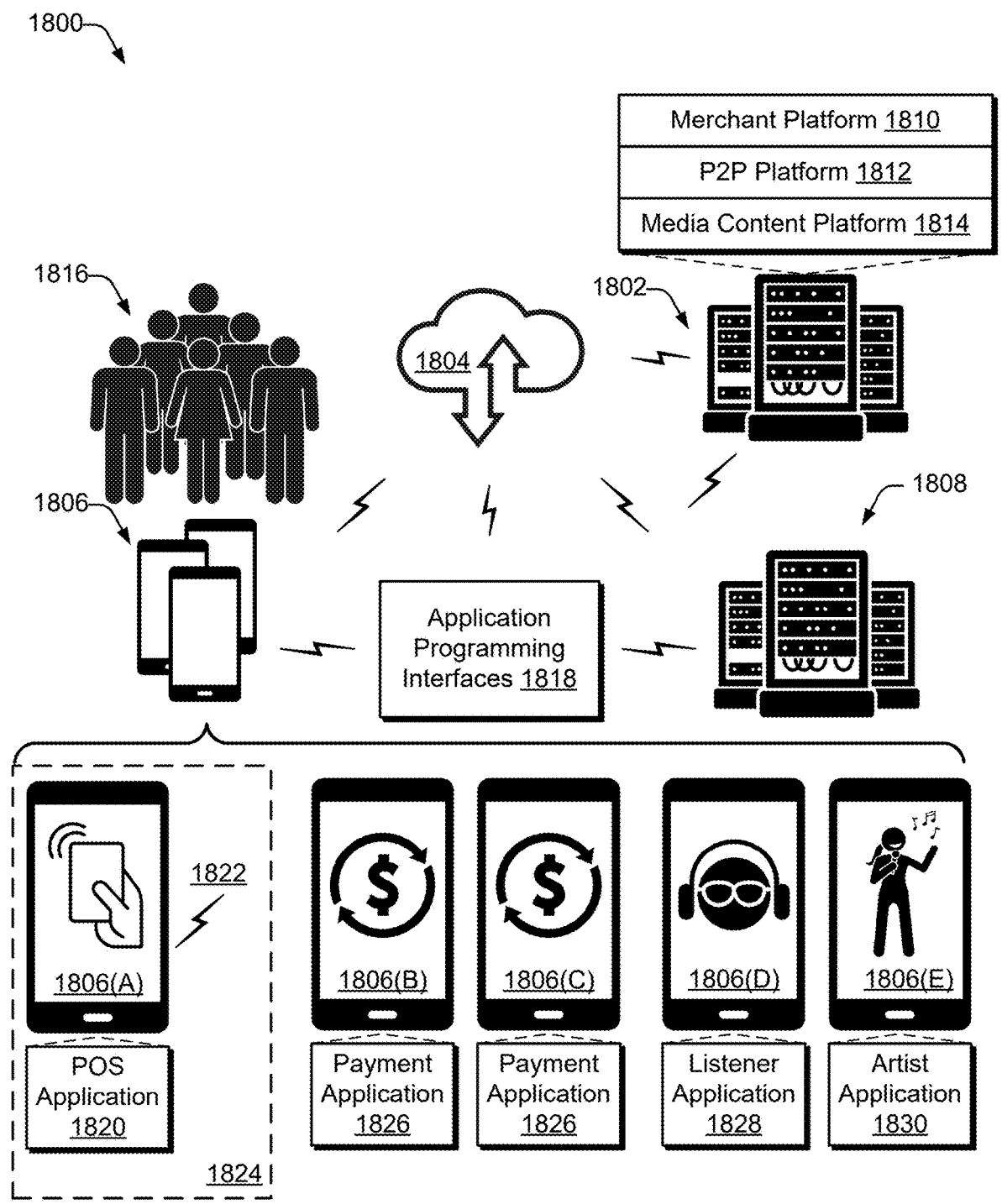
FIG. 18 is a non-limiting example illustrating an environment in which decentralized-to-digital service relay techniques and decentralized hash table techniques described herein are performed in accordance with one or more implementations.

FIG. 18 illustrates an example environment 1800 in which recommendation techniques described herein are performed in accordance with one or more implementations. The environment 1800 includes server(s) 1802 that can communicate over a network 1804 with end user devices 1806 and/or server(s) 1808 associated with third-party service provider(s). In various examples, the end user devices 1806 may comprise one or more seller devices 1806(A), one or more user devices 1806(B) and/or 1806(C) in a peer network, one or more content consumption devices 1806(D), one or more artist devices 1806(E), combinations of these examples, or other categories of user devices. The server(s) 1802 can be associated with one or more service providers that can provide one or more services for the benefit of users 1816, as described below. For example, the server(s) 1802 may enable services of service providers such as in association with a seller platform 1810 (which may further include a buyer platform), a peer-to-peer (P2P) payment platform 1812, a media content platform 1814, a combination of these platforms, or other platforms associated with other service providers. While services and features are referenced throughout in connection with a particular one of the seller platform 1810, the P2P payment platform 1812, or the media content platform 1814, it should be understood that any of these platforms may perform the functionality described in relation to any of the other platforms. Actions attributed to the service provider(s) can be performed by the server(s) 1802 of the service provider system 108, hash service system 1002, and so on.

In some examples, individual ones of the end user devices 1806 can be operable by users 1816. The users 1816 (individually referred to herein as "user 1816") can be referred to as customers, buyers, merchants, sellers, borrowers, employees, employers, payors, payees, couriers, artists, musicians, listeners, fans, supervisors, hosts, audience members, and so on. The users 1816 can interact with the end user devices 1806 via user interfaces presented via the end user devices 1806. In at least one example, a user interface can be presented via a web browser, or the like. Alternatively or additionally, a user interface can be presented via an application, such as a mobile application or desktop application, which can be provided by the seller platform 1810, the P2P payment platform 1812, and/or the media content platform 1814, or which can be an otherwise dedicated application. In some examples, individual end user devices 1806 can have an instance or versioned instance of an application, which can be downloaded from an application store, for example, which can present the user interface(s) described herein.

In at least one example, the users 1816 can include merchants that can operate the seller device(s) 1806(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1806(A) can have an instance of a point of sale ("POS") application 1820 stored thereon. The POS application 1820 can configure the seller device 1806(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1820 can determine transaction data associated with the POS transactions. Transaction data can include payment information, which can be obtained from a reader device 1822 associated with the seller device 1806(A), user authentication data, purchase amount information, point-of-purchase information (e.g., item(s) purchased, date of purchase, time of purchase, subscription type, etc.), etc. The POS application 1820 can send transaction data to the server(s) 1802 such that the server(s) 1802 can track transactions of the customers, merchants, and/or the users 1816 over time. Furthermore, the POS application 1820 can present a UI to enable the merchant to interact with the POS application 1820 and/or the seller platform 1810 via the POS application 1820.

In at least one example, the seller device 1806(A) can be a special-purpose computing device configured as a POS terminal (via the execution of the POS application 1820). In at least one example, the POS terminal may be connected to a reader device 1822, which is capable of accepting a variety of payment instruments, such as credit cards, debit cards, gift cards, short-range communication based payment instruments, and the like, as described below. In at least one example, the reader device 1822 can plug in to a port in the seller device 1806(A), such as a microphone port, a headphone port, an audio-jack, a data port, or other suitable port. In additional or alternative examples, the reader device 1822 can be coupled to the seller device 1806(A) via another wired or wireless connection, such as via Bluetooth®, BLE, and so on. In some examples, the reader device 1822 can be a software solution executing on the POS terminal, e.g., a mobile phone. In some examples, the reader device 1822 can read information from alternative payment instruments including, but not limited to, wristbands and the like.

In some examples, the reader device 1822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1822, and communicate with the seller platform 1810, which can provide, among other services, a payment processing service. The server(s) 1802 associated with the seller platform 1810 can communicate with server(s) 1808, as described below. In this manner, the POS terminal and reader device 1822 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1822 of the POS system 1824 are shown as separate devices, in additional or alternative examples, the POS terminal and the reader device 1822 can be part of a single device. In some examples, the reader device 1822 can have a display integrated therein for presenting information to customers of a merchant. In additional or alternative examples, the POS terminal can have a display integrated therein for presenting information to the customers of the merchant. POS systems, such as the POS system 1824, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1822, whereby the reader device 1822 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1824, the server(s) 1802, and/or the server(s) 1808 may exchange payment information and transaction data to determine whether transactions are authorized. For example, the POS system 1824 may provide encrypted payment data, user authentication data, purchase amount information, point-of-purchase information, etc. (collectively, transaction data) to server(s) 1802 over the network(s) 1804. The server(s) 1802 may send the transaction data to the server(s) 1808.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1808 associated therewith) can forward the fund transfer request to an issuing bank (e.g., "issuer"). The issuer is a bank or financial institution that offers a financial account (e.g., credit or debit card account) to a user. The issuer (e.g., the server(s) 1808 associated therewith) can make a determination as to whether the customer has the capacity to absorb the relevant charge associated with the payment transaction. In at least one example, the seller platform 1810 can serve as an issuer and/or can partner with an issuer. The transaction is either approved or rejected by the issuer and/or the card payment network (e.g., the server(s) 1808 associated therewith), and a payment authorization message is communicated from the issuer to the POS device via a path opposite of that described above, or via an alternate path.

The server(s) 1808 may send an authorization notification over the network(s) 1804 to the server(s) 1802, which may send the authorization notification to the POS system 1824 over the network(s) 1804 to indicate whether the transaction is authorized. The server(s) 1802 may also transmit additional information such as transaction identifiers to the POS system 1824. In one example, the server(s) 1802 may include a merchant application and/or other functional components for communicating with the POS system 1824 and/or the server(s) 1808 to authorize or decline transactions (e.g., the API 1818). In examples, the seller platform 1810 can enable the merchants to receive cash payments, payment card payments, and/or electronic payments from customers for POS transactions and the service provider can process transactions on behalf of the merchants.

Based on the authentication notification that is received by the POS system 1824 from server(s) 1802, the merchant may indicate to the customer whether the transaction has been approved. In some examples, approval may be indicated at the POS system 1824, for example, at a display of the POS system 1824. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1810 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1806 can access all of the services. In some cases, the user devices 1806 can have gradated access to the services, which can be based on risk tolerance, IDV outputs, subscriptions, and so on. In at least one example, access to such services can FIG. 1 be availed to the merchants via the POS application 1820. In additional or alternative examples, each service can be associated with its own access point (e.g., application, web browser, etc.).

As the seller platform 1810 processes transactions on behalf of the merchants, the seller platform 1810 can maintain accounts or balances for the merchants in one or more ledgers. For example, the seller platform 1810 can analyze transaction data received for a transaction to determine an amount of funds owed to a merchant for the transaction and deposit funds into an account of the merchant. The account can have a stored balance, which can be managed by the seller platform 1810. The account can be different from a conventional bank account at least because the stored balance is managed by a ledger of the seller platform 1810 and the associated funds are accessible via various withdrawal channels including, but not limited to, scheduled deposit, same-day deposit, instant deposit, and a linked payment instrument.

A scheduled deposit can occur when the seller platform 1810 transfers funds associated with a stored balance of the merchant to a bank account of the merchant that is held at a bank or other financial institution (e.g., associated with the server(s) 1808). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1810 to the bank account of the merchant.

In at least one example, the seller platform 1810 may provide inventory management services. That is, the seller platform 1810 may provide inventory tracking and reporting. Inventory management services may enable the merchant to access and manage a database storing data associated with a quantity of each item that the merchant has available (i.e., an inventory). Furthermore, in at least one example, the seller platform 1810 can provide catalog management services to enable the merchant to maintain a catalog, which can be a database storing data associated with items that the merchant has available for acquisition (i.e., catalog management services). The seller platform 1810 can offer recommendations related to pricing of the items, placement of items on the catalog, and multi-party fulfillment of the inventory, to name a few examples.

In at least one example, the seller platform 1810 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1810 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1810 can provide financing services for offering and/or lending a loan to a borrower that is to be used for, in some instances, financing the borrower's short-term operational needs (e.g., a capital loan). Additionally or alternatively, the seller platform 1810 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1810 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1810 can provide web-development services, which enable users 1816 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1810 can recommend and/or generate content items to supplement omni-channel presences of the merchants.

Furthermore, the seller platform 1810 can provide payroll services to enable employers to pay employees for work performed on behalf of employers. In at least one example, the seller platform 1810 can receive data that includes time worked by an employee (e.g., through imported timecards and/or POS interactions), sales made by the employee, gratuities received by the employee, and so forth. Based on such data, the seller platform 1810 can make payroll payments to employee(s) on behalf of an employer via the payroll service. For instance, the seller platform 1810 can facilitate the transfer of a total amount to be paid out for the payroll of an employee from the bank of the employer to the bank of the seller platform 1810 to be used to make payroll payments. In at least one example, when the funds have been received at the bank of the seller platform 1810, the seller platform 1810 can pay the employee, such as by check or direct deposit.

Moreover, in at least one example, the seller platform 1810 can provide employee management services for managing schedules of employees. Further, the seller platform 1810 can provide appointment services for enabling users 1816 to set schedules for scheduling appointments and/or users 1816 to schedule appointments.

In some examples, the seller platform 1810 can provide restaurant management services to enable users 1816 to make and/or manage reservations, to monitor front-of-house and/or back-of-house operations, and so on. In such examples, the seller device(s) 1806(A) and/or server(s) 1802 can be configured to communicate with one or more other computing devices, which can be located in the front-of-house (e.g., POS device(s)) and/or back-of-house (e.g., kitchen display system(s) (KDS)). In at least one example, the seller platform 1810 can provide order management services and/or fulfillment services to enable restaurants (or other merchant types) to manage open tickets, split tickets, and so on and/or manage fulfillment services.

In some examples, the seller platform 1810 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1810 can leverage other merchants and/or sales channels that are part of the seller platform 1810 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1810 can enable conversational commerce via conversational commerce services, which can use one or more machine learning mechanisms to analyze messages exchanged between two or more users 1816, voice inputs into a virtual assistant or the like, to determine intents of user(s) 1816. In some examples, the seller platform 1810 can utilize determined intents to automate customer service, offer promotions, provide recommendations, or otherwise interact with customers in real-time. In at least one example, the seller platform 1810 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1816 may be new to the seller platform 1810 such that the user 1816 that has not registered (e.g., subscribed to receive access to one or more services offered by the seller platform 1810) with the seller platform 1810. The seller platform 1810 can offer onboarding services for registering a potential user 1816 with the seller platform 1810. In some examples, onboarding can involve presenting various questions, prompts, and the like to a potential user 1816 to obtain information that can be used to generate a profile for the potential user 1816. In at least one example, the seller platform 1810 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1810 can be transitioned to more permissive (e.g., less limited) or longer-term access to such services.

The seller platform 1810 can be associated with IDV services, which can be used by the seller platform 1810 for compliance purposes and/or can be offered as a service, for instance to third-party service providers (e.g., associated with the server(s) 1808). That is, the seller platform 1810 can offer IDV services to verify the identity of users 1816 seeking to use or using their services. Identity verification may involve requesting a customer (or potential customer) to provide information that is used by compliance departments to prove that the information is associated with an identity of a real person or entity (e.g., an artist). In at least one example, the seller platform 1810 can perform services for determining whether identifying information provided by a user 1816 accurately identifies the customer (or potential customer).

Techniques described herein can be configured to operate in both real-time/online and offline modes. "Online" modes refer to modes when devices are capable of communicating with the seller platform 1810 while offline mode refers to modes when devices are unable to communicate with the server(s) 1808 due to network connectivity issue, for example. In such examples, devices may operate in "offline" mode where at least some payment data is stored (e.g., on the seller device(s) 1806(A)) and/or the server(s) 1802 until connectivity is restored and the payment data can be transmitted to the server(s) 1802 and/or the server(s) 1808 for processing.

In at least one example, the seller platform 1810 can be associated with a hub, such as an order hub, an inventory hub, a fulfillment hub and so on, which can enable integration with one or more additional service providers (e.g., associated with the additional server(s) 1808). In some examples, such additional service providers can offer additional or alternative services and the service provider can provide an interface or other computer-readable instructions to integrate functionality of the service provider into the one or more additional service providers.

Turning now to the P2P functionality provided by the environment 1800, the P2P platform 1812 can provide a peer-to-peer payment service that enables peer-to-peer payments between two or more of the users 1816. Two or more of the users 1816 may be considered "peers" in a peer-to-peer interaction, such as a payment. In at least one example, the P2P platform 1812 can communicate with instances of a payment application 1826 (or other access point) installed on end user devices 1806 configured for operation by the users 1816. In an example, an instance of the payment application 1826 executing on a first user device 1806(B) operated by a payor (e.g., one of the users 1816) can send a request to the P2P platform 1812 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1816) via a peer-to-peer payment. In some examples, assets associated with an account of the payor are transferred to an account of the payee. In some examples, assets can be held at least temporarily in an account of the P2P platform 1812 prior to transferring the assets to the account of the payee.

Figure 19:
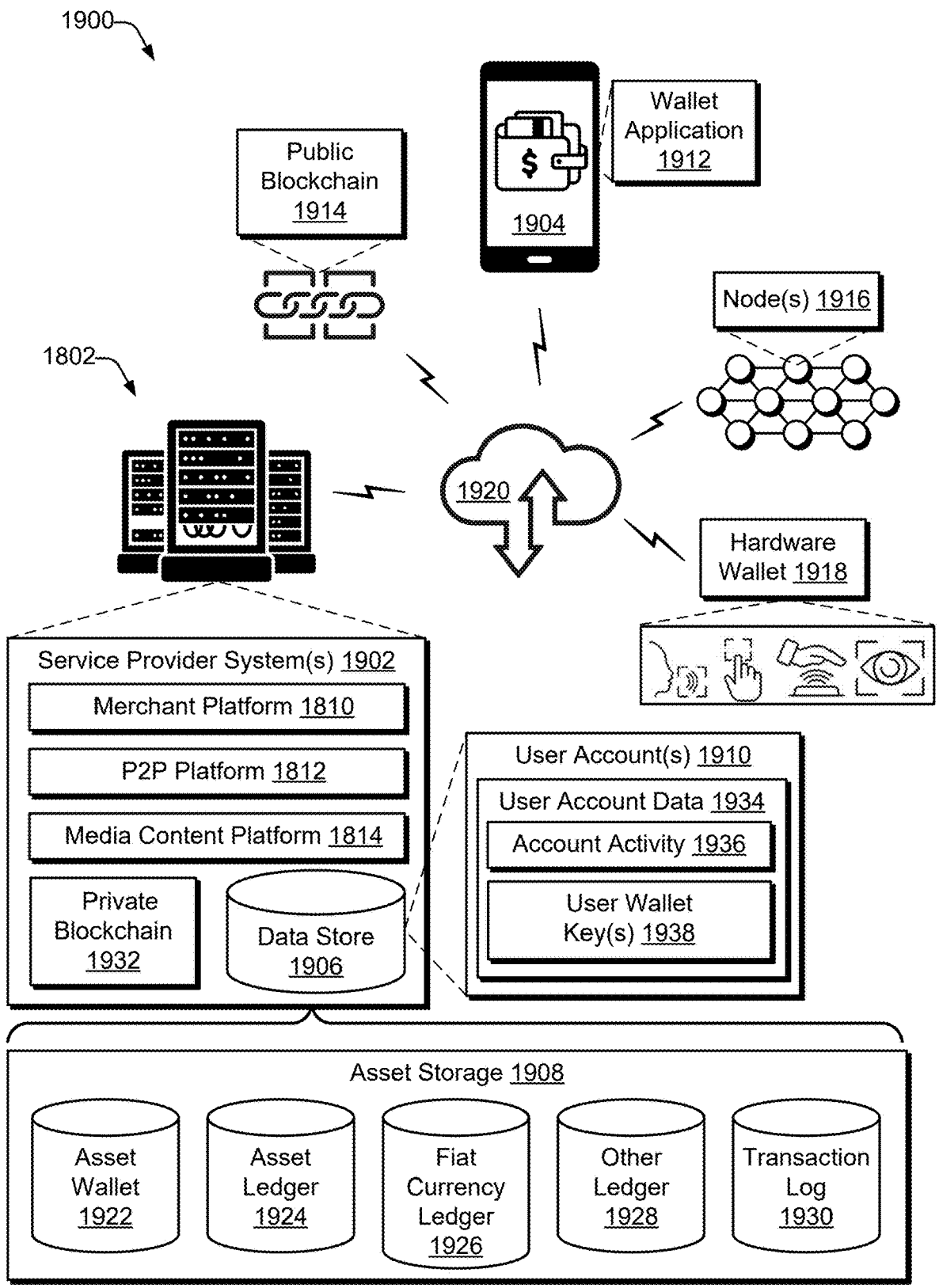
FIG. 19 is a non-limiting example illustrating an environment in which decentralized-to-digital service relay techniques and decentralized hash table techniques described herein are performed in accordance with one or more implementations.

In some examples, the P2P platform 1812 can utilize a ledger system to track transfers of assets between users 1816. FIG. 19, below, provides additional details associated with such a ledger system. The ledger system can enable users 1816 to own fractional shares of assets that are not conventionally available. For instance, a user can own a fraction of a Bitcoin, an NFT, or a stock. Additional details are described herein.

In at least one example, the P2P platform 1812 can facilitate transfers and can send notifications related thereto to instances of the payment application 1826 executing on user device(s) of payee(s). As an example, the P2P platform 1812 can transfer assets from an account of a first user to an account of a second user and can send a notification to the user device 1806(B) of the second user for presentation via a user interface. The notification can indicate that a transfer is in process, a transfer is complete, or the like. In some examples, the P2P platform 1812 can send additional or alternative information to the instances of the payment application 1826 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1812 funds the request to payee on behalf of the payor, to speed up the transfer process and compensate for lags that may be attributed to the payor's financial network.

In some examples, the P2P platform 1812 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1826 executing on the end user devices 1806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1812 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 18 or a third-party service provider associated with the server(s) 1808. In examples where the content provider is a third-party service provider, the server(s) 1808 can be accessible via one or more APIs 1818 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1812 (e.g., the P2P platform 1812 offers a chat or messaging service that is within the payment application or accessible via the payment application). In some examples, the messaging application can be external to the P2P platform 1812. (e.g., the messaging application is hosted by a third-party service provider associated with the server(s) 1808, which can be accessible via one or more of the APIs 1818 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1812 can enable users 1816 to perform banking transactions via instances of the payment application 1826. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1812 can enable users to allocate funds between different accounts, sub-accounts, or balances (e.g., spending, saving, different assets, different currencies), etc. Further, users 1816 can configure bill pay, recurring payments, and/or the like using assets associated with their accounts. In some examples, the P2P platform 1812, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1812 enables users to buy and/or sell assets via asset networks such as cryptocurrency networks, securities networks, and/or the like. In some examples, acquisition of such assets can be in whole or fractional shares. The ledger system described below with reference to FIG. 19 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1812 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1812 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1812 can automatically apply the amount of funds associated with the gift card to the transaction.

In some examples, users can configure their account such that when they use their payment instruments, the P2P platform 1812 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1812 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1812 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1812 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1812.

In some examples, components of the environment 1800 may be integrated to enable payments at the point-of-sale using assets associated with user accounts of the P2P platform 1812. As illustrated in the environment 1800, the components can communicate with one another via the network 1804, where one or more APIs 1818 or other functional components can be used to facilitate such communication.

In at least one example, an integration can enable a customer to participate in a transaction via their own computing device (e.g., user device 1806(B)) instead of interacting with a merchant device of a merchant, such as the seller device 1806(A). In such an example, the POS application 1820, associated with a payment processing platform and executable by the seller device 1806(A) of the merchant, can present a Quick Response (QR) code, or other code that can be used to identify a transaction (e.g., a transaction code), in association with a transaction between the customer and the merchant. The QR code, or other transaction code, can be provided to the POS application 1820 via an API 1818 associated with the peer-to-peer payment platform. In an example, the customer can utilize their own computing device, such as the user device 1806(B), to capture the QR code, or the other transaction code, and to provide an indication of the captured QR code, or other transaction code, to server(s) 1802.

Based at least in part on the integration of the peer-to-peer payment platform and the payment processing platform (e.g., via the API 1818), the server(s) 1802 of the seller platform 1810 can exchange communications with a payment application 1826 associated with the P2P platform 1812 and/or the POS application 1820 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1812 and seller platform 1810 (which can be a first- or third-party integration) such that a QR code, or other transaction code, specific to the transaction can be used for providing transaction details, location details, customer details, or the like to a computing device of the customer, such as the user device 1806(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1806(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1820 and the payment application 1826, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1806(B), can be specially configured as a buyer-facing device having functionality similar to the functionality described above in the brick-and-mortar example.

In some examples, based at least in part on capturing the QR code, or other transaction code, the seller platform 1810 can provide transaction data to the P2P platform 1812 for presentation via the payment application 1826 on the computing device of the customer, such as the user device 1806B(B), to enable the customer to complete the transaction via their own computing device. In some examples, in response to receiving an indication that the QR code, or other transaction code, has been captured or otherwise interacted with via the customer computing device, the P2P platform 1812 can determine that the customer authorizes payment of the transaction using funds associated with a stored balance of the customer that is managed and/or maintained by the P2P platform 1812. Such authorization can be implicit such that the interaction with the transaction code can imply authorization of the customer. Alternatively or additionally, the P2P platform 1812 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1812 can transfer funds from the stored balance of the customer to the seller platform 1810. In at least one example, the seller platform 1810 can deposit the funds, or a portion thereof, into a stored balance of the merchant that is managed and/or maintained by the seller platform 1810. In such an example, the seller platform 1810 can be a "peer" to the customer in a peer-to-peer transaction.

In some examples, techniques described herein can enable the customer to interact with the transaction after payment for the transaction has been settled. For example, in at least one example, the seller platform 1810 can cause a total amount of a transaction to be presented via a user interface associated with the payment application 1826 such that the customer can provide gratuity, feedback, loyalty information, or the like, via an interaction with the user interface. In another example, the seller platform 1810 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1812, if the customer inputs a tip and/or an event affecting the total amount of the transaction is triggered, the P2P platform 1812 can transfer additional funds, associated with the tip or event, to the seller platform 1810. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1826 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1812 as described herein (e.g., a debit card linked to a stored balance of a customer) such that when the payment instrument is caused to interact with a payment reader, the seller platform 1810 can exchange communications with the P2P platform 1812 to authorize payment for a transaction and/or provision associated transaction data to a computing device of the customer associated with the transaction.

Turning now to media content functionality provided by the environment 1800, the media content platform 1814 can provide digital media to a content consumption device 1806(D) where playback may occur using "streaming." In examples, "streaming" media content involves encoding the media content and transmitting the encoded media content over the network 1804 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1814 can provide a digital media streaming service (e.g., subscription-based, non-subscription-based) that enables a content consumption device 1806(D) to stream and/or download digital media content via a listener application 1828 installed on the content consumption device 1806(D). For instance, the media content platform 1814 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1806(D), the listener application 1828 may verify access rights to the digital media content items at time intervals, for instance intermittently (e.g., when the content consumption device 1806(D) has a network connection with the media content platform 1814 via the network(s) 1804), and/or at regular intervals (e.g., daily, weekly, monthly, etc.). In examples, access rights to the digital media content items may be provided when a subscription to the media content platform 1814 is active, while access rights to the digital media content items may be withheld when the subscription to the media content platform 1814 is terminated. Enabling storage on the end user devices 1806 and subsequent access to digital media content items via the listener application 1828 provides the users 1816 with the ability to access the digital media content items "offline" such as when a connection to the media content platform 1814 via the network(s) 1804 is unavailable or unreliable.

In some examples, the media content platform 1814 may additionally or alternatively provide an artist management service that enables the users 1816 to manage aspects of artist business via an artist application 1830 installed on the artist device 1806(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1816 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1816 may have access to a single user account via respective end user devices 1806, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1830 and the listener application 1828 may be distinct applications having differing user experiences and verification processes for access, such as illustrated in the environment 1800. For instance, the media content platform 1814 may request additional verification, such as a link to an artist website, a sample of an artist's work, a verified credential supplied by a third party, etc. to grant access to the artist application 1830 in addition to information requested to access the listener application 1828. Further, the artist application 1830 may provide the artist management services described herein, without the subscription-based digital media streaming services described herein, and vice versa. However, examples are also considered in which functionality provided by the artist application 1830 and the listener application 1828 partially or fully overlap, and/or where verification processes for access are substantially similar.

In at least some examples, the media content platform 1814 enables interaction between the users 1816 utilizing the listener application 1828 installed on the content consumption devices 1806(D), and the users 1816 utilizing the artist application 1830 installed on the artist devices 1806 (E). For example, the media content platform 1814 may provide interconnectivity between the subscription-based digital media streaming service and the artist management service. Functionality provided by the media content platform 1814 in such instances may include a communication channel between one or more of the users 1816 (e.g., a listener, fan, music supervisor, publisher, etc.) utilizing the listener application 1828 and another user (e.g., an artist) of the users 1816 utilizing the artist application 1830. The communication channel may include, for instance, a messaging platform (also referred to as a "messaging application" herein), a live streaming platform, a videoconferencing or teleconferencing platform, and/or a combination of these.

Additionally, in some cases, the media content platform 1814 may facilitate a resource transfer between the listener application 1828 and the artist application 1830. In an example, the media content platform 1814 may direct a resource, such as a portion of a subscription fee paid by one of the users 1816 designated as a listener, to one or more of the users 1816 designated as artists based on a number of instances that the listening user consumed (e.g., streamed, downloaded, etc.) content created by respective ones of the artist users. Alternatively or additionally, the media content platform 1814 may direct a resource, such as funds, from an account associated with a listening user to an account associated with an artist user (or vice versa), in accordance with transfers between accounts as described herein. The media content platform 1814 may facilitate resource transfers in examples such as merchandise purchases, event ticket purchases, "tipping" an artist, payments for royalties or other fees, and so forth.

In some examples, the media content platform 1814 enables interaction between individual ones of the users 1816 with one another via the listener application 1828 installed on the content consumption device 1806(D) and other of the content consumption devices 1806(D) via a communication channel as described above. In an example, the listener application 1828 may provide functionality via a communication channel for a user to stream an individual digital media item, a playlist, or the like to an audience comprising other ones of the content consumption devices 1806(D). Alternatively or additionally, the communication channel may facilitate sharing of individual digital media items, playlists, user and/or artist profiles, and the like between the users 1816 via messages, uniform resource locators (URLs), quick response (QR) codes, and so forth.

In some cases, the media content platform 1814 enables interaction between individual ones of the users 1816 with one another via the artist application 1830 installed on the artist device 1806(E) and other of the artist devices 1806 via a communication channel as described above. In some instances, the media content platform 1814 may provide recommendations for a particular user indicating which of the other users 1816 to communicate with. Such a recommendation may be based on a similarity (or dissimilarity) of content created by two or more of the users 1816, an overlap (or lack thereof) of audience members of the users 1816, a geographic location of the users 1816, a coinciding event location of the users 1816, and so forth. In some examples, a user may input parameters for a desired connection via the artist application 1830, and the media content platform 1814 may filter which of the users 1816 to surface for recommendations to the user based on the input parameters. Alternatively or additionally, the media content platform 1814 may implement one or more machine learning models to filter which of the users 1816 to surface for recommendations to the user. The recommendations provided by the media content platform 1814 may be data driven and thus increase relevance of communications presented to the users 1816 and reduce unsolicited communications that may be received by the users 1816.

The media content platform 1814 may interact with the server(s) 1808 associated with the third-party service providers to, for instance, ingest digital media items, report digital media consumption data, pay royalties, and the like. In some examples, the server(s) 1808 may be accessible by the media content platform 1814 via one or more APIs 1818 or other integrations. In some cases, the third-party service provider may be a digital media content provider (e.g., a record label, a performance rights organization (PRO), an independent artist, etc.). In such cases, the media content platform 1814 may receive digital media content items from the server(s) 1808, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1814 may use the metadata to associate the digital media content item as being created by a particular user, to provide search results to the users 1816, to generate playlists, and so forth. Further, the media content platform 1814 may provide payments (e.g., royalties) to the third-party service provider based on a number of streams and/or downloads of individual digital media content items by the users via the listener application 1828.

Techniques described herein are directed to services provided via a distributed system of end user devices 1806 that are in communication with server(s) 1802 of the service provider. That is, techniques described herein are directed to a specific implementation—or, a practical application—of utilizing a distributed system of end user devices 1806 that are in communication with server(s) 1802 of the seller platform 1810, the P2P platform 1812, and/or the media content platform 1814 to perform a variety of services, as described above. The unconventional configuration of the distributed system described herein enables the server(s) 1802 that are remotely-located from end-users (e.g., users 1816) to intelligently offer services based on aggregated data associated with the end-users, such as the users 1816 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1810, the P2P platform 1812, and/or the media content platform 1814, and those outside of the control of these service providers, to track the standing (payables, receivables, payroll, invoices, appointments, capital, balances, collaborations, etc.) of the users 1816. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1816 and end user devices 1806. Furthermore, such features are changed dynamically based on the profiles of the users involved interacting with the GUIs. As such, techniques described herein are directed to improvements to computing systems.

The seller platform 1810, the P2P platform 1812, and/or the media content platform 1814 are capable of providing additional or alternative services, and the services described above are offered as a sampling of services. In at least one example, the seller platform 1810, the P2P platform 1812, and/or the media content platform 1814 can exchange data with the server(s) 1808 associated with third-party service providers. Such third-party service providers can provide information that enables the seller platform 1810, the P2P platform 1812, and/or the media content platform 1814 to provide services, such as those described above. In additional or alternative examples, such third-party service providers can access services of the seller platform 1810, the P2P platform 1812, and/or the media content platform 1814. That is, in some examples, the third-party service providers can be subscribers, or otherwise access, services of the seller platform 1810, the P2P platform 1812, and/or the media content platform 1814.

FIG. 19 illustrates an example environment 1900 including a service provider system 1902 which may be associated with the server(s) 1802 of FIG. 18. The environment 1900 may also include a user device 1904, which may correspond to any of the end user devices 1806 described in relation to FIG. 18. In examples, the service provider system 1902 may include one or a combination of the seller platform 1810, the P2P platform 1812, or the media content platform 1814, as well as one or more data store(s) 1906 that can store assets in an asset storage 1908, as well as data in user account(s) 1910. In some examples, the environment 1900 may also include a public blockchain 1914, one or more nodes 1916, and/or a hardware wallet 1918. The service provider system 1902, the user device 1904, public blockchain 1914, the node(s) 1916, and the hardware wallet 1918 may be connected and able to communicate via one or more networks 1920, which may have the same or similar functionality described in relation to the network 1804 of FIG. 18.

In some examples, user account(s) 1910 can include merchant account(s), customer account(s), media content subscriber account(s), artist account(s), and so forth. In at least one example, the asset storage 1908 can be used to record whether individual assets are registered to a user account 1910. For example, the asset storage 1908 can include asset wallet(s) 1922 for storing records of assets owned by the service provider system 1902, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1808 of FIG. 18 can be associated therewith.

The asset wallet 1922 can be associated with one or more addresses and can vary addresses used to acquire assets (e.g., from the asset network(s)) so that its holdings are represented under a variety of addresses on the asset network. In examples where the service provider system 1902 has holdings of cryptocurrency (e.g., in the asset wallet 1922), a user can acquire cryptocurrency directly from the service provider system 1902. In some examples, the service provider system 1902 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1902 can provide the same or similar functionality for securities or other assets.

The asset storage 1908 may contain ledgers that store records of assignments of assets to users 1816. Specifically, the asset storage 1908 may include asset ledger 1924, fiat currency ledger 1926, and/or other ledger(s) 1928, which can be used to record transfers of assets between users 1816 and/or one or more third-parties (e.g., merchant network(s), payment card network(s), ACH network(s), equities network(s), the asset network, securities networks, etc.). In doing so, the asset storage 1908 can maintain a running balance of assets managed by the service provider system 1902. The ledger(s) of the asset storage 1908 can further indicate some of the running balance for individual ledger(s) stored in the asset storage 1908 are assigned or registered to one or more user account(s) 1910.

In at least one example, the asset storage 1908 can include transaction logs 1930, which can include, as transaction data, records of past transactions involving the service provider system 1902 and/or the user account 1910. In some examples, the data store(s) 1906 can store a private blockchain 1932. A private blockchain 1932 can function to record sender addresses, recipient addresses, public keys, values of cryptocurrency transferred, and/or can be used to verify ownership of cryptocurrency tokens to be transferred. In some examples, the service provider system 1902 can record transactions involving cryptocurrency until the number of transactions has exceeded a determined limit (e.g., number of transactions, storage space allocation, etc.). Based at least in part on determining that the limit has been reached, the service provider system 1902 can publish the transactions in the private blockchain 1932 to the public blockchain 1914 (e.g., associated with the asset network), where miners can verify the transactions and record the transactions to blocks on the public blockchain 1914. In at least one example, the service provider system 1902 can participate as miner(s) at least for transactions to which the respective platform is a party to, to be posted to the public blockchain 1914.

In some cases, the data store(s) 1906 can store and/or manage multiple user accounts, an example of which is described in relation to the user account 1910. In at least one example, the user account 1910 can include user account data 1934, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1934 can include account activity 1936 and user wallet key(s) 1938. In some examples, the user wallet key(s) 1938 can include a public-private key-pair and a respective address associated with the asset network or other asset networks. In some examples, the user wallet key(s) 1938 may include one or more key pairs, which can be unique to the asset network or other asset networks.

In addition to the user account data 1934, the user account 1910 can include ledger(s) for account(s) managed by the service provider system 1902, for the user. For example, the user account 1910 may include an asset ledger 1924, a fiat currency ledger 1926, and/or one or more other ledgers 1928. The ledger(s) can indicate that a corresponding user utilizes the service provider system 1902 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1902.

In some examples, the asset ledger 1924 can store a balance for each of one or more cryptocurrencies (e.g., Bitcoin, Ethereum, Litecoin, etc.) registered to the user account 1910. In at least one example, the asset ledger 1924 can further record transactions of cryptocurrency assets associated with the user account 1910. For example, the user account 1910 can receive cryptocurrency from the asset network using the user wallet key(s) 1938. In some examples, the user wallet key(s) 1938 may be generated for the user upon request. User wallet key(s) 1938 can be requested by the user in order to send, exchange, or otherwise control the balance of cryptocurrency held by the service provider system 1902 (e.g., in the asset wallet 1922) and registered to the user. In some examples, the user wallet key(s) 1938 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1902 and the value is credited as a balance in asset ledger 1924), by purchasing currency in the form associated with the account using currency in a different form (e.g., buying a value of cryptocurrency from the service provider system 1902 using a value of fiat currency reflected in fiat currency ledger 1926, and crediting the value of cryptocurrency in asset ledger 1924), or by conducting a transaction with another user (customer or merchant) of the service provider system 1902 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1902 (i.e., an external account). Such a transaction can request that the user to transfer an amount of the cryptocurrency in a message signed by user's private key to an address provided by the service provider system 1902. In at least one example, the transaction can be sent to miners to bundle the transaction into a block of transactions and to verify the authenticity of the transactions in the block. Once a miner has verified the block, the block is written to the public blockchain 1914 where the service provider system 1902 can then verify that the transaction has been confirmed and can credit the user's asset ledger 1924 with the transferred amount. When an account is funded by transferring cryptocurrency from a third-party cryptocurrency wallet, an update can be made to the public blockchain 1914. In some cases, this update of the public blockchain 1914 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1902. As described above, in some examples, the service provider system 1902 can acquire cryptocurrency from a third-party source. In examples where the service provider system 1902 has its own cryptocurrency assets, cryptocurrency transferred in a transaction (e.g., data with address provided for receipt of transaction and a balance of cryptocurrency transferred in the transaction) can be stored in an asset wallet 1922 associated with the service provider system 1902. In at least one example, the service provider system 1902 can credit the asset ledger 1924 of the user. Additionally, while the service provider system 1902 recognizes that the user retains the value of the transferred cryptocurrency through crediting the asset ledger 1924, an inspection of the blockchain will show the cryptocurrency as having been transferred to the service provider system 1902. In some examples, the asset wallet 1922 can be associated with many different addresses. In such examples, an inspection of the blockchain may not necessarily associate all cryptocurrency stored in asset wallet 1922 as belonging to the same entity. The presence of a private ledger used for real-time transactions and maintained by the service provider system 1902, combined with updates to the public ledger at other times, allows for extremely fast transactions using cryptocurrency to be achieved. In some examples, the "private ledger" can refer to the asset ledger 1924, which in some examples, can utilize the private blockchain 1932, as described herein. The "public ledger" can correspond to the public blockchain 1914 associated with the asset network.

In at least one example, an asset ledger 1924, fiat currency ledger 1926, or the like associated with the user account 1910 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1924. In some examples, a user can receive fiat currency or another currency in the form of payment for a transaction with another user. In at least one example, at least a portion of such funds can be converted into cryptocurrency by the service provider system 1902 and used to fund the asset ledger 1924 of the user.

In examples, a user can also have an account in U.S. dollars, which can be tracked, for example, via the fiat currency ledger 1926. Such an account can be funded by transferring money from a bank account at a third-party bank to an account maintained by the service provider system 1902 as is conventionally known. In some examples, a user can receive fiat currency in the form of payment for a transaction with another user. In such examples, at least a portion of such funds can be used to fund the fiat currency ledger 1926.

In some examples, a user can have one or more internal payment cards registered with the service provider system 1902. Internal payment cards can be linked to one or more of the accounts associated with the user account 1910. In some embodiments, options with respect to internal payment cards can be adjusted and managed using an application (e.g., the payment application 1826, a wallet application 1912, etc.).

In at least one example, the user account 1910 can be associated with the asset wallet accessible via a wallet application 1912 of the user device 1904, or a stored balance for use in payment transactions, peer-to-peer transactions, payroll payments, etc. In at least one example, the asset wallet 1922 can store data indicating an address provided for receipt of a cryptocurrency transaction. In at least one example, the balance of the asset wallet 1922 can be based at least in part on a balance of the asset ledger 1924. In at least one example, funds availed via the asset wallet 1922 can be stored in the asset wallet 1922. Funds availed via the asset wallet 1922 can be tracked via the asset ledger 1924. The asset wallet 1922, however, can be associated with additional cryptocurrency funds.

In at least one example, when the service provider system 1902 includes a private blockchain 1932 for recording and validating cryptocurrency transactions, the asset wallet 1922 can be used instead of, or in addition to, the asset ledger 1924. For example, a merchant can provide the address of the asset wallet 1922 for receiving payments. In an example where a customer is paying in cryptocurrency and the customer has their own cryptocurrency wallet account associated with the service provider system 1902, the customer can send a message signed by its private key including its wallet address (i.e., of the customer) and identifying the cryptocurrency and value to be transferred to the merchant's asset wallet 1922. The service provider system 1902 can complete the transaction by reducing the cryptocurrency balance in the customer's cryptocurrency wallet and increasing the cryptocurrency balance in the merchant's asset wallet 1922. In addition to recording the transaction in the respective cryptocurrency wallets, the transaction can be recorded in the private blockchain 1932 and the transaction can be confirmed. A user can perform a similar transaction with cryptocurrency in a peer-to-peer transaction as described above.

While the asset ledger 1924 and/or asset wallet 1922 are each described above with reference to cryptocurrency, the asset ledger 1924 and/or asset wallet 1922 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1902 is an aspect of the technology disclosed that enables technical advantages of increased processing speed and improved security.

The description of the environment 1900 above generally relates to a centralized service provider that at least partially facilitates storing and managing assets in the data store 1906. However, the environment 1900 may also facilitate decentralized storage and management of assets alternatively or in addition to centralized storage and management as described above. For instance, the environment 1900 may include a decentralized platform implemented using a plurality of nodes (e.g., web nodes), an example of which is illustrated as node 1916. The node 1916 is representative of a computer or other device tasked with validating transactions and/or maintaining a copy of a blockchain ledger, such as a ledger associated with the public blockchain 1914. The decentralized platform may be implemented via the environment 1900 through use of decentralized identifiers and verifiable credentials that are stored and managed by user devices 1904. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1902). The decentralized identity referenced by a decentralized identifier gives an entity control over what data can be accessed, stored, modified, and so forth by other entities, such as the service provider system 1902.

The node 1916, as representative of one of a plurality of decentralized nodes (e.g., decentralized web nodes), supports data storage and relays that allows entities, service provider systems, individuals, organizations and so forth to send, store, and receive encrypted or public messages and data. The node 1916 is universally addressable and is "crawlable" using data addressing in relation to the decentralized identifiers. The node 1916 is also configured to support decentralized replication of data across the nodes that is consistent across multiple nodes over time through continued data communication between the nodes in the decentralized platform. The node 1916 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1904 may be an issuer, a holder, and/or a verifier, as can the service provider system 1902.

In some examples, the user device 1904 may implement a wallet application 1912 configured to manage decentralized identifiers and/or verifiable credentials. For instance, the wallet application 1912 may provide a user interface for implementation of access controls to various data associated with the decentralized identifier by the service provider system 1902, to other user devices, and so forth. Additionally, the wallet application 1912 may be configured to provide functionality for resource transfers (e.g., cryptocurrency, fiat currency, etc.) with the service provider system 1902, other user devices, and the like, based on techniques described herein.

In some examples, the hardware wallet 1918 may store cryptocurrency assets in combination with the wallet application 1912 and the service provider system 1902. For instance, the hardware wallet 1918, the wallet application 1912, and the service provider system 1902 may each store a respective, different private key, where a transaction with the cryptocurrency assets is signed by at least two of the three private keys. The user interface provided by the wallet application 1912 may allow a user to request a transaction. The wallet application 1912 may then sign the transaction with the private key of the wallet application 1912, have either the hardware wallet 1918 or the service provider system 1902 use a second of the three private keys to sign the transaction, and then provide the transaction with two signatures to the public blockchain 1914 for processing.

Figure 20:
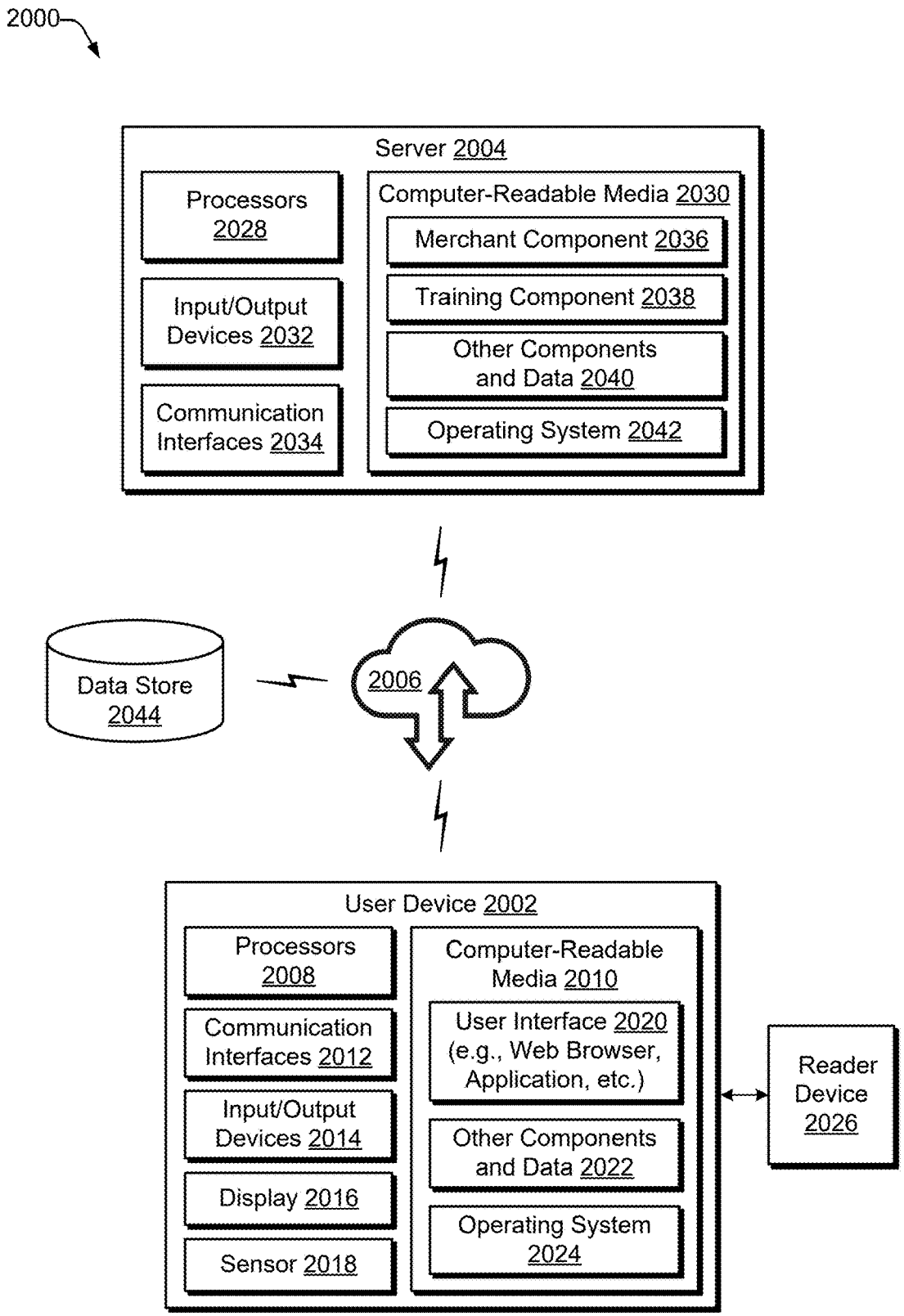
FIG. 20 is a non-limiting example illustrating an environment in which decentralized-to-digital service relay techniques and decentralized hash table techniques described herein are performed in accordance with one or more implementations.

FIG. 20 depicts an illustrative block diagram illustrating a system 2000 for performing techniques described herein. The system 2000 includes a user device 2002, that communicates with server computing device(s) (e.g., server(s) 2004) via network(s) 2006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 2002 is illustrated, in additional or alternate examples, the system 2000 can have multiple user devices, as described above with reference to FIG. 18 and for the client device 104.

In at least one example, the user device 2002 can be any suitable type of computing device, e.g., portable, semi-portable, semi-stationary, or stationary. Some examples of the user device 2002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 2002 can be any computing device capable of sending communications and performing the functions according to the techniques described herein. The user device 2002 can include devices, e.g., payment card readers, or components capable of accepting payments, as described below. The user device 2002 may be representative of, and provide functionality for, the user devices 1806 described in relation to FIG. 18.

In the illustrated example, the user device 2002 includes one or more processors 2008, one or more computer-readable media 2010, one or more communication interface(s) 2012, one or more input/output (I/O) devices 2014, a display 2016, and sensor(s) 2018. The user device 2002 is also configurable to include one or more encoders and one or more decoders.

In at least one example, each processor 2008 can itself comprise one or more processors or processing cores. For example, the processor(s) 2008 can be implemented as one or more microprocessors, microcomputers, microcontrollers, digital signal processors, central processing units, state machines, logic circuitries, and/or any devices that manipulate signals based on operational instructions. In some examples, the processor(s) 2008 can be one or more hardware processors and/or logic circuits of any suitable type specifically programmed or configured to execute the algorithms and processes described herein. The processor(s) 2008 can be configured to fetch and execute computer-readable processor-executable instructions stored in the computer-readable media 2010.

Depending on the configuration of the user device 2002, the computer-readable media 2010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 2010 can include, but is not limited to, RAM, ROM, EEPROM, flash memory, solid-state storage, magnetic disk storage, optical storage, and/or other computer-readable media technology. Further, in some examples, the user device 2002 can access external storage, such as RAID storage systems, storage arrays, network attached storage, storage area networks, cloud storage, or any other medium that can be used to store information and that can be accessed by the processor(s) 2008 directly or through another computing device or network. Accordingly, the computer-readable media 2010 can be computer storage media able to store instructions, components or components that can be executed by the processor(s) 2008. Further, when mentioned, non-transitory computer-readable media exclude media such as energy, carrier signals, electromagnetic waves, and signals per se.

The computer-readable media 2010 can be used to store and maintain any number of functional components that are executable by the processor(s) 2008. In some implementations, these functional components comprise instructions or programs that are executable by the processor(s) 2008 and that, when executed, implement operational logic for performing the actions and services attributed above to the user device 2002. Functional components stored in the computer-readable media 2010 can include a user interface 2020 to enable users to interact with the user device 2002, and thus the server(s) 2004 and/or other networked devices. In at least one example, a user can interact with the user interface via touch input, spoken input, gesture, or any other type of input for a variety of user interfaces, examples of which include user interfaces 308, 1102, 1306, 1504, 1510. The word "input" is also used to describe "contextual" input that may not be directly provided by the user via the user interface 2020. For example, user's interactions with the user interface 2020 are analyzed using, e.g., natural language processing techniques, user movement tracking techniques, eye tracking techniques, etc. to determine context or intent of the user, which may be treated in a manner similar to "direct" user input.

Depending on the type of the user device 2002, the computer-readable media 2010 can also optionally include other functional components and data, such as other components and data 2022, which can include programs, drivers, etc., and the data used or generated by the functional components. In addition, the computer-readable media 2010 can also store data, data structures and the like, that are used by the functional components. Further, the user device 2002 can include many other logical, programmatic and physical components, of which those described are merely examples that are related to the discussion herein.

In at least one example, the computer-readable media 2010 can include additional functional components, such as an operating system 2024 for controlling and managing various functions of the user device 2002 and for enabling user interactions.

The communication interface(s) 2012 can include one or more interfaces and hardware components for enabling communication with various other devices, such as over the network(s) 2006 or directly. For example, communication interface(s) 2012 can enable communication through one or more network(s) 2006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 2002 can further include one or more input/output (I/O) devices 2014. The I/O devices 2014 can include speakers, a microphone, a camera, and various user controls (e.g., buttons, a joystick, a keyboard, a keypad, etc.), a haptic output device, and so forth. The I/O devices 2014 can also include attachments that leverage the accessories (audio-jack, USB-C, Bluetooth, etc.) to connect with the user device 2002.

In at least one example, user device 2002 can include a display 2016. Depending on the type of computing device(s) used as the user device 2002, the display 2016 can employ any suitable display technology. For example, the display 2016 can be a liquid crystal display, a plasma display, a light emitting diode display, an OLED (organic light-emitting diode) display, an electronic paper display, or any other suitable type of display able to present digital content thereon. In at least one example, the display 2016 can be an augmented reality display, a virtual reality display, or any other display able to present and/or project digital content. In some examples, the display 2016 can have a touch sensor associated with the display 2016 to provide a touchscreen display configured to receive touch inputs for enabling interaction with a graphic interface presented on the display 2016. Accordingly, implementations herein are not limited to any particular display technology. In some examples, the user device 2002 may not include the display 2016, and information can be presented by other means, such as aurally, haptically, etc.

In addition, the user device 2002 can include sensor(s) 2018. The sensor(s) 2018 can include a global positioning system ("GPS") device able to indicate location information. Further, the sensor(s) 2018 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1810, the P2P platform 1812, and/or the media content platform 1814, described above, to provide one or more services. That is, in some examples, the service provider can implement geofencing to provide particular services to users by the seller platform 1810, the P2P platform 1812, and/or the media content platform 1814.

In examples, the user device 2002 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 2000, the server 2004 may include an encoder and/or a decoder as well.

Additionally, the user device 2002 can include various other components that are not shown, examples of which include removable storage, a power source, such as a battery and power control unit, a barcode scanner, a printer, a cash drawer, and so forth.

In addition, as described in relation to FIG. 18, the user device 2002 can include, be connectable to, or otherwise be coupled to a reader device 2026, for reading payment instruments and/or identifiers associated with payment objects. The reader device 2026 can include a read head for reading a magnetic strip of a payment card, and further can include encryption technology for encrypting the information read from the magnetic strip. Additionally or alternatively, the reader device 2026 can be an EMV payment reader, which in some examples, can be embedded in the user device 2002. Moreover, numerous other types of readers can be employed with the user device 2002 herein, depending on the type and configuration of the user device 2002.

The reader device 2026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 2026 may include hardware implementation, such as slots, magnetic tracks, and rails with one or more sensors or electrical contacts to facilitate detection and acceptance of a payment instrument. That is, the reader device 2026 may include hardware implementations to enable the reader device 2026 to interact with a payment instrument via a swipe, a dip, or a tap to obtain payment data associated with a customer. Additionally or optionally, the reader device 2026 may also include a biometric sensor to receive and process biometric characteristics and process them as payment instruments, given that such biometric characteristics are registered with the payment service and connected to a financial account with a bank server. The reader device 2026 may include processing unit(s), computer-readable media, a reader chip, a transaction chip, a timer, a clock, a network interface, a power supply, and so on. That is, the reader device 2026 may include any of the computing components described herein with reference to the user device 2002 to implement the functionality provided by the reader device 2026.

In examples, the reader device 2026 includes a reader chip, which may perform functionality to control the power supply, among other functionality of the reader device 2026. The power supply may include one or more power supplies such as a physical connection to AC power or a battery. Power supply may include power conversion circuitry for converting AC power and generating a plurality of DC voltages for use by components of reader device 2026. When power supply includes a battery, the battery may be charged via a physical power connection, via inductive charging, or via any other suitable method.

The reader device 2026 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 2002, which can be a POS terminal, and the reader device 2026 are shown as separate devices, in additional or alternative examples, the user device 2002 and the reader device 2026 can be part of a single device, which may be a battery-operated device. In some examples, the reader device 2026 can have a display integrated therewith, which can be in addition to (or as an alternative of) the display 2016 associated with the user device 2002.

The server(s) 2004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2004 can include one or more processors 2028, one or more computer-readable media 2030, one or more I/O devices 2032, and one or more communication interfaces 2034. Each processor 2028 can be a single processing unit or a number of processing units and can include single or multiple computing units or multiple processing cores. The processor(s) 2028 can be implemented as one or more microprocessors, microcomputers, microcontrollers, digital signal processors, central processing units, state machines, logic circuitries, and/or any devices that manipulate signals based on operational instructions. For example, the processor(s) 2028 can be one or more hardware processors and/or logic circuits of any suitable type specifically programmed or configured to execute the algorithms and processes described herein. The processor(s) 2028 can be configured to fetch and execute computer-readable instructions stored in the computer-readable media 2030, which can program the processor(s) 2028 to perform the functions described herein.

The computer-readable media 2030 can include volatile and nonvolatile memory and/or removable and non-removable media implemented in any type of technology for storage of information, such as computer-readable instructions, data structures, program components, or other data. Such computer-readable media 2030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2004, the computer-readable media 2030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2030 can be used to store any number of functional components that are executable by the processor(s) 2028. In many implementations, these functional components comprise instructions or programs that are executable by the processors 2028 and that, when executed, specifically configure the one or more processors 2028 to perform the actions attributed above to the seller platform 1810, the P2P platform 1812, and/or the media content platform 1814. Functional components stored in the computer-readable media 2030 can optionally include a merchant component 2036, a training component 2038, and one or more other components and data 2040. The computer-readable media 2030 can additionally include an operating system 2042 for controlling and managing various functions of the server(s) 2004.

The merchant component 2036 can be configured to receive transaction data from POS systems, such as the POS system 1824 described above with reference to FIG. 18. The merchant component 2036 can transmit requests (e.g., authorization, capture, settlement, etc.) to payment service server computing device(s) to facilitate POS transactions between merchants and customers. The merchant component 2036 can communicate the successes or failures of the POS transactions to the POS systems.

The training component 2038 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 2002 and/or the server(s) 2004 for use at a time after the data models have been trained (e.g., at runtime).

The one or more other components and data 2040 can include functionality of which is described above. Further, the one or more other components and data 2040 can include programs, drivers, etc., and the data used or generated by the functional components. Further, the server(s) 2004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 2034 can include one or more interfaces and hardware components for enabling communication with various other devices, such as over the network(s) 2006 or directly. For example, communication interface(s) 2034 can enable communication through one or more network(s) 2006, which can include, but are not limited any type of network known in the art, as described herein.

The server(s) 2004 can further be equipped with various I/O devices 2032. Such I/O devices 2032 can include a display, various user interface controls (e.g., buttons, joystick, keyboard, mouse, touch screen, biometric or sensory input devices, etc.), audio speakers, connection ports and so forth.

In at least one example, the system 2000 can include a datastore 2044 that can be configured to store data that is accessible, manageable, and updatable. In some examples, the datastore 2044 can be integrated with the user device 2002 and/or the server(s) 2004. In other examples, as shown in FIG. 20, the datastore 2044 can be located remotely from the server(s) 2004 and can be accessible to the server(s) 2004. The datastore 2044 can comprise multiple databases and/or servers connected locally and/or remotely via the network(s) 2006. In at least one example, the datastore 2044 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 2044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 2044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   forming a network of decentralized nodes individually configured to store, receive, and transmit data based on rules associated with the decentralized nodes;
   generating a decentralized identifier associated with an entity;
   associating the decentralized identifier of the entity with a select decentralized node of the decentralized nodes;
   composing a decentralized document that is configured to resolve the decentralized identifier to the select decentralized node;
   receiving a hash table input at a hash service system, the hash table input including the decentralized identifier, index data configured to locate the decentralized identifier, the decentralized document, and a signature as signed by a cryptographic key associated with the decentralized identifier;
   verifying, by the hash service system, the hash table input corresponds to the entity based on the signature;
   generating, by the hash service system responsive to the verifying, a hash table entry for inclusion in a decentralized hash table in compliance with a hash table schema;
   generating a decentralized search result that includes the decentralized identifier based on the hash table entry, the hash table entry located using the index data as part of a search performed in response to a decentralized identifier search query; and verifying, by a client device, that the decentralized search result corresponds to the entity based on the signature as included in the decentralized search result, the decentralized search result configured to:
- locate the select decentralized node within the network of decentralized nodes using the decentralized identifier associated with the entity; and
- obtain endpoint data from an endpoint associated with the entity at the select decentralized node.

2. The method of claim 1, wherein the index data identifies the entity.

3. The method of claim 1, wherein the index data describes the endpoint data available at the endpoint.

4. The method of claim 1, wherein the decentralized search result includes the decentralized document and the locating of the select decentralized node is performed using the decentralized document.

5. The method of claim 1, wherein the hash table input is received by crawling the network of decentralized nodes and locating data maintained by the network of decentralized nodes, respectively.

6. The method of claim 5, wherein the generating of the hash table entry is performed by indexing the data obtained by the crawling of the network of decentralized nodes.

7. The method of claim 1, wherein the hash table input is received responsive to user inputs received via a user interface by the entity to specify the index data.

8. The method of claim 1, wherein the generating of the hash table entry is performed using generative artificial intelligence as implemented using a machine-learning model.

9. The method of claim 1, further comprising receiving a topic request at the hash service system from the client device and subscribing the client device to a topic associated with the topic request.

10. The method of claim 9, further comprising generating a publication for receipt by the client device, the publication including respective said index data from respective said hash table entries that correspond to the topic.

11. A system comprising:
- a processing device; and
- a computer-readable storage medium storing instructions that, responsive to execution by the processing device, causes the processing device to perform operations including:
  - forming a network of decentralized nodes individually configured to store, receive, and transmit data based on rules associated with the decentralized nodes;
  - generating a decentralized identifier associated with an entity;
  - associating the decentralized identifier of the entity with a select decentralized node of the decentralized nodes;
  - composing a decentralized document that is configured to resolve the decentralized identifier to the select decentralized node;
  - receiving a hash table input at a hash service system, the hash table input including the decentralized identifier, index data configured to locate the decentralized identifier, the decentralized document, and a signature as signed by a cryptographic key associated with the decentralized identifier;
  - verifying, by the hash service system, the hash table input corresponds to the entity based on the signature;
  - generating, by the hash service system responsive to the verifying, a hash table entry for inclusion in a decentralized hash table in compliance with a hash table schema;
  - generating a decentralized search result that includes the decentralized identifier based on the hash table entry, the hash table entry located using the index data as part of a search performed in response to a decentralized identifier search query; and
  - verifying that the decentralized search result corresponds to the entity based on the signature as included in the decentralized search result, the decentralized search result configured to:
    - locate the select decentralized node within the network of decentralized nodes using the decentralized identifier associated with the entity; and
    - obtain endpoint data from an endpoint associated with the entity at the select decentralized node.

12. The system of claim 11, wherein the operations further comprise receiving a topic request from the client device and subscribing the client device to a topic associated with the topic request.

13. The system of claim 12, wherein the operations further comprise generating a publication for receipt by the client device, the publication including respective said index data from respective said hash table entries that correspond to the topic.

14. The system of claim 11, wherein the hash table input is received by crawling the network of decentralized nodes and locating data maintained by the network of decentralized nodes, respectively.

15. The system of claim 14, wherein the generating of the hash table entry is performed by indexing the data obtained by the crawling of the network of decentralized nodes.

16. The system of claim 11, wherein the hash table input is received responsive to user inputs received via a user interface to specify the index data.

17. The method of claim 11, wherein the generating of the hash table entry is performed using generative artificial intelligence as implemented using a machine-learning model.

18. One or more non-transitory computer-readable storage media storing instructions that, responsive to execution by a processing device, causes the processing device to perform operations including:
- forming a network of decentralized nodes individually configured to store, receive, and transmit data based on rules associated with the decentralized nodes;
- generating a decentralized identifier associated with an entity;
- associating the decentralized identifier of the entity with a select decentralized node of the decentralized nodes;
- composing a decentralized document that is configured to resolve the decentralized identifier to the select decentralized node;
- receiving a hash table input at a hash service system, the hash table input including the decentralized identifier, index data configured to locate the decentralized identifier, the decentralized document, and a signature as signed by a cryptographic key associated with the decentralized identifier;
- verifying, by the hash service system, the hash table input corresponds to the entity based on the signature;

generating, by the hash service system responsive to the verifying, a hash table entry for inclusion in a decentralized hash table in compliance with a hash table schema;

generating a decentralized search result that includes the decentralized identifier based on the hash table entry, the hash table entry located using the index data as part of a search performed in response to a decentralized identifier search query; and verifying that the decentralized search result corresponds to the entity based on the signature as included in the decentralized search result, the decentralized search result configured to:

locate the select decentralized node within the network of decentralized nodes using the decentralized identifier associated with the entity; and obtain endpoint data from an endpoint associated with the entity at the select decentralized node.

19. The one or more non-transitory computer-readable storage media as described in claim 18, wherein the decentralized search result includes the decentralized identifier document and the locating of the select decentralized node is performed using the decentralized document.

\* \* \* \* \*